(12) United States Patent
Xu et al.

(10) Patent No.: US 12,167,263 B2
(45) Date of Patent: Dec. 10, 2024

(54) COMMUNICATIONS METHOD AND APPARATUS

(71) Applicant: HUAWEI TECHNOLOGIES CO., LTD., Shenzhen (CN)

(72) Inventors: Bin Xu, Beijing (CN); Hong Wang, Beijing (CN); Bingzhao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 356 days.

(21) Appl. No.: 17/682,488

(22) Filed: Feb. 28, 2022

(65) Prior Publication Data
US 2022/0182863 A1 Jun. 9, 2022

Related U.S. Application Data

(63) Continuation of application No. PCT/CN2019/103456, filed on Aug. 29, 2019.

(51) Int. Cl.
*H04W 24/08* (2009.01)
*H04L 5/00* (2006.01)
*H04W 36/30* (2009.01)
*H04W 36/32* (2009.01)

(52) U.S. Cl.
CPC ............ *H04W 24/08* (2013.01); *H04L 5/006* (2013.01); *H04W 36/302* (2023.05); *H04W 36/322* (2023.05)

(58) Field of Classification Search
None
See application file for complete search history.

(56) References Cited

U.S. PATENT DOCUMENTS

| 10,291,310 | B1* | 5/2019 | Gopal | H04B 7/0817 |
| 2009/0247161 | A1* | 10/2009 | Pani | H04W 36/0072 455/435.3 |
| 2011/0250893 | A1 | 10/2011 | Lee et al. | |
| 2012/0294184 | A1 | 11/2012 | Jung et al. | |
| 2013/0194950 | A1 | 8/2013 | Haghighat et al. | |
| 2013/0196650 | A1* | 8/2013 | Futaki | H04W 24/10 455/424 |

(Continued)

FOREIGN PATENT DOCUMENTS

| CN | 106488472 A | 3/2017 |
| CN | 107277845 A | 10/2017 |

(Continued)

OTHER PUBLICATIONS

Chinese Office Action issued in corresponding Chinese Application No. 201980098622.3, dated Mar. 27, 2023, pp. 1-8.

(Continued)

*Primary Examiner* — Kenny S Lin
(74) *Attorney, Agent, or Firm* — HAUPTMAN HAM, LLP

(57) ABSTRACT

A communication method includes determining, by a processor, that a terminal device meets a first condition based on the signal quality of at least one reference signal of a serving cell of the terminal device. The at least one reference signal corresponds to at least one sending direction. The method also includes skipping performing an intra-frequency measurement or an inter-frequency measurement.

20 Claims, 7 Drawing Sheets

(56) References Cited

U.S. PATENT DOCUMENTS

| | | | |
|---|---|---|---|
| 2014/0099956 A1* | 4/2014 | Wan | H04W 36/0085 |
| | | | 455/436 |
| 2015/0208303 A1* | 7/2015 | Jung | H04W 24/10 |
| | | | 455/436 |
| 2016/0227452 A1 | 8/2016 | Liu | |
| 2017/0127397 A1* | 5/2017 | Hahn | H04W 28/0236 |
| 2017/0150410 A1* | 5/2017 | Yang | H04W 36/00835 |
| 2017/0201306 A1 | 7/2017 | Shimezawa et al. | |
| 2018/0287677 A1 | 10/2018 | Nagaraja et al. | |
| 2018/0324620 A1* | 11/2018 | Harada | H04W 16/14 |
| 2018/0352508 A1* | 12/2018 | Fujishiro | H04W 76/10 |
| 2019/0045416 A1 | 2/2019 | Hwang et al. | |
| 2019/0074887 A1 | 3/2019 | Yiu et al. | |
| 2019/0081680 A1* | 3/2019 | Wu | H04B 7/0639 |
| 2019/0215743 A1 | 7/2019 | Liu et al. | |
| 2019/0380073 A1 | 12/2019 | Martin et al. | |
| 2020/0322856 A1* | 10/2020 | Wang | H04W 48/16 |
| 2021/0136640 A1 | 5/2021 | Liu et al. | |

FOREIGN PATENT DOCUMENTS

| | | |
|---|---|---|
| CN | 107770831 A | 3/2018 |
| CN | 108260136 A | 7/2018 |
| CN | 108271173 A | 7/2018 |
| CN | 108271236 A | 7/2018 |
| CN | 108282794 A | 7/2018 |
| CN | 108464039 A | 8/2018 |
| CN | 109391983 A | 2/2019 |
| CN | 109923896 A | 6/2019 |
| CN | 110034853 A | 7/2019 |
| EP | 3668161 A1 | 6/2020 |
| WO | 2016075123 A1 | 5/2016 |
| WO | 2018059487 A1 | 4/2018 |
| WO | 2018127395 A1 | 7/2018 |
| WO | 2019004784 A1 | 1/2019 |
| WO | 2019031919 A1 | 2/2019 |
| WO | 2019137172 A1 | 7/2019 |

OTHER PUBLICATIONS

MediaTek Inc., Impacts of Small Cell On and Off. 3GPP TSG-RAN2 #86 Meeting, Seoul, South Korea, May 19-23, 2014, R2-142179, 7 pages.
3GPP TS 36.321 V15.6.0 (Jun. 2019), 3rd Generation Partnership Project; Technical Specification Group Radio Access Network; Evolved Universal Terrestrial Radio Access (E-UTRA); Medium Access Control (MAC) protocol specification (Release 15), 133 pages.
3GPP TS 38.331 V15.6.0 (Jun. 2019), 3rd Generation Partnership Project; Technical Specification Group Radio Access Network; NR; Radio Resource Control (RRC) protocol specification(Release 15), 519 pages.
3GPP TS 38.523-1 V15.4.0 (Jun. 2019), 3rd Generation Partnership Project; Technical Specification Group Radio Access Network; 5GS; User Equipment (UE) conformance specification; Part 1: Protocol(Release 15), 1723 pages.
Extended European Search Report issued in corresponding European Application No. 19941378.2, dated Jul. 13, 2022, pp. 1-10.
Huawei, HiSilicon, ZTE, Introduction of mobility enhancement UE capabilities. 3GPP TSG-RAN2 Meeting #95bis, Kaohsiung, Oct. 10-14, 2016, R2-166398, 2 pages.
ZTE, ZTE Microelectronics, Consideration on the RRM Measurement for NR. 3GPP TSG-RAN WG2 Meeting #96, Reno, USA, Nov. 14-18, 2016, R2-167836, 6 pages.
Samsung, Cell Quality Derivation based on Measurements from Individual Beams. 3GPP TSG RAN WG2 #96, Reno, USA, Nov. 14 to 18, 2016, R2-168042, 5 pages.
Intel Corporation, Measurements in NR. 3GPP TSG RAN WG2 Meeting #96, Reno, Nevada, Nov. 14-18, 2016, R2-168511, 6 pages.
Chinese Office Action issued in corresponding Chinese Application No. 201980098622.3, dated Nov. 3, 2022, pp. 1-9.
Chinese Notice of Allowance issued in corresponding Chinese Application No. 201980098622.3, dated Aug. 22, 2023, pp. 1-5.
Chinese Office Action issued in corresponding Chinese Application No. 201980098622.3, dated May 18, 2023, pp. 1-8.
MediaTek Inc., Report of email discussion [105bis#29][NR/Power Saving] RRM solutions. 3GPP TSG-RAN WG2 Meeting #106, Reno, NV, USA, May 13-17, 2019, R2-1908249, 20 pages.
Extended European Search Report issued in corresponding European Application No. 19943445.7, dated Jun. 29, 2022, pp. 1-10.
3GPP TS 38.300 V15.6.0 (Jun. 2019), 3rd Generation Partnership Project; Technical Specification Group Radio Access Network; NR; NR and NG-RAN Overall Description; Stage 2(Release 15), 99 pages.
3GPP TS 38.323 V15.6.0 (Jun. 2019), 3rd Generation Partnership Project; Technical Specification Group Radio Access Network; NR; Packet Data Convergence Protocol (PDCP) specification (Release 15), 26 pages.
3GPP TS 38.322 V15.5.0 (Mar. 2019), 3rd Generation Partnership Project; Technical Specification Group Radio Access Network; NR; Radio Link Control (RLC) protocol specification(Release 15), 33 pages.
3GPP TS 38.321 V15.6.0 (Jun. 2019), 3rd Generation Partnership Project; Technical Specification Group Radio Access Network; NR; Medium Access Control (MAC) protocol specification(Release 15), 78 pages.
International Search Report issued in corresponding International Application No. PCT/CN2019/103456, dated May 21, 2020, pp. 1-80.

* cited by examiner

COMMUNICATIONS METHOD AND APPARATUS

CROSS-REFERENCE TO RELATED APPLICATIONS

This application is a continuation of International Application No. PCT/CN2019/103456, filed on Aug. 29, 2019, the disclosure of which is hereby incorporated by reference in its entirety.

TECHNICAL FIELD

This application relates to the field of mobile communications technologies, and in particular, to a communications method apparatus.

BACKGROUND

Currently, to save energy, a mechanism for reducing measurement power consumption is introduced into a terminal device: The terminal device determines, by determining a movement status of the terminal device, how to perform signal measurement. Assuming that a probability that the terminal device moves in a period of time is low, the terminal device may not measure signal quality of a cell in a period of time, to reduce power consumption.

Currently, when a terminal device moves laterally or moves circularly by using a base station as a circle center, it is difficult for the terminal device to accurately determine a movement status of the terminal device based on signal quality of a serving cell. Consequently, the movement status may be mistakenly determined, and therefore a wrong measurement decision may be made. Even when the terminal device is located at an edge location of the serving cell, the terminal device cannot perform cell reselection through measurement, which affects a subsequent communication service.

A problem of how to enable the terminal device to more accurately determine the movement status of the terminal device needs to be resolved as soon as possible.

SUMMARY

Embodiments of this application provide a communications method and apparatus, to provide a manner of accurately determining whether a terminal device meets a relaxed measurement rule.

According to a first aspect, a first communications method is provided. The method includes: determining, based on signal quality of at least one reference signal of serving cell of a terminal device, that the terminal device meets a first condition, where the at least one reference signal corresponds to at least one sending direction; and performing measurement according to a first measurement rule.

The method may be performed by a first communications apparatus. The first communications apparatus may be a communications device or a communications apparatus, for example, a chip system, that can support the communications device in implementing a function required in the method. For example, the first communications apparatus is a terminal apparatus. For example, the terminal apparatus is a terminal device, a chip system that is disposed in the terminal device and that is configured to implement functions of the terminal device, or another component configured to implement functions of the terminal device.

In this embodiment of this application, it may be determined, based on the signal quality of the at least one reference signal of the serving cell of the terminal device, that the terminal device may not perform intra-frequency measurement or inter-frequency measurement, that is, a movement status of the terminal device may be determined based on the signal quality of the at least one reference signal. For example, it may be determined that the terminal device is in a static state or is not in a moving state. Therefore, the terminal device may not perform intra-frequency measurement or inter-frequency measurement. The at least one reference signal corresponds to different sending directions, that is, direction information may be added when the movement status of the terminal device is determined, so that accuracy of a determining result can be improved, and impact on a communication process of the terminal device can be reduced. For example, the first measurement rule may also be referred to as a relaxed measurement rule. For example, the first measurement rule includes: skipping performing intra-frequency measurement or inter-frequency measurement. Alternatively, for example, the first measurement rule includes one or any combination of the following: reducing to-be-measured bandwidth, reducing a quantity of to-be-measured cells, or reducing a quantity of to-be-measured frequencies. For example, the first measurement rule may include: reducing the to-be-measured bandwidth. Alternatively, the first measurement rule may include: reducing the quantity of to-be-measured cells and reducing the quantity of to-be-measured frequencies. Alternatively, the first measurement rule may include: reducing the to-be-measured bandwidth, reducing the quantity of to-be-measured cells, and reducing the quantity of to-be-measured frequencies.

With reference to the first aspect, in a possible implementation of the first aspect, the determining, based on signal quality of at least one reference signal of a serving cell of a terminal device, that the terminal device meets a first condition includes:

if the terminal device determines that signal quality of a first reference signal of the serving cell meets a first sub-condition in first duration, the terminal device determines that the terminal device meets the first condition, where the signal quality of the first reference signal is higher than signal quality of another reference signal in the at least one reference signal; or if the terminal device determines that signal quality of each of M reference signals in the at least one reference signal meets a first sub-condition in first duration, the terminal device determines that the terminal device meets the first condition, where M is an integer greater than or equal to 1, and M is less than or equal to a quantity of the at least one reference signal; or the terminal device obtains first information based on the signal quality of the at least one reference signal, and if the terminal device determines that the first information meets a second sub-condition in first duration, the terminal device determines that the terminal device meets the first condition.

For example, the first reference signal may be any one of the at least one reference signal. For example, only one of the at least one reference signal needs to be randomly selected, and it may be considered that the terminal device meets the first condition, provided that signal quality of the reference signal meets the first sub-condition in the first duration. Such a manner of determining that the terminal device meets the first condition is simple. The terminal device only needs to randomly select one reference signal to obtain signal quality of the reference signal, and determines whether the signal quality of the reference signal meets the first sub-condition in the first duration. Therefore, a workload of the terminal device is light, and power consumption is low. Alternatively, the first reference signal may be a reference signal with highest signal quality in the at least one reference signal, that is, the signal quality of the first reference signal is higher than or equal to signal quality of a reference signal other than the first reference signal in the at least one reference signal. This may also mean that a beam used to send the first reference signal is an optimal beam in at least one beam. A change of an optimal reference signal (that is, a reference signal with highest signal quality, an optimal beam, or a reference signal sent through an optimal beam) is more sensitive to movement of the terminal device, and therefore the optimal reference signal can better represent a movement status of the terminal device. If signal quality of the optimal reference signal meets the first sub-condition in the first duration, it may be considered that the terminal device meets the first condition. The terminal device needs to determine, based on only one reference signal, that the terminal device meets the first condition, but does not need to process excessive reference signals, to help reduce a workload of the terminal device.

Alternatively, the terminal device may determine, based on signal quality of the M reference signals, that the terminal device meets the first condition, that is, the terminal device may consider second signal quality of a plurality of reference signals, and determine whether the second signal quality of the plurality of reference signals meets the first sub-condition, to improve accuracy of a determining result.

Alternatively, the terminal device may obtain the first information based on the at least one piece of signal quality of the at least one reference signal, and determine whether the first information meets the second sub-condition, that is, comprehensively determine whether the signal quality of the at least one reference signal meets the second sub-condition, to improve accuracy of a determining result.

With reference to the first aspect, in a possible implementation of the first aspect, the method further includes:

based on the signal quality of the at least one reference signal, determining that the terminal device is located at an edge location of the serving cell of the terminal device, or determining that the terminal device meets a criterion for performing neighboring cell measurement.

If the terminal device determines that the terminal device is located at a center location of the cell, the terminal device may continue to determine whether the terminal device meets the first condition. The terminal device at the center of the cell may be stable, for example, a probability that the terminal device may be in a static state is high, or a probability of performing cell handover or reselection is low. Even if measurement is not performed, normal work may not be affected. In other words, the terminal device at the center of the cell may not need to perform measurement. Therefore, the terminal device at the center of the cell needs to use the relaxed measurement rule. In this way, if the terminal device is located at the center location of the cell, the terminal device may determine whether the terminal device meets the first condition, so that the technical solution provided in this embodiment of this application can be applied to a terminal device that has more requirements. However, if the terminal device is located at the edge location of the cell, the terminal device may no longer need to determine whether the terminal device meets the first condition. For example, the terminal device may directly normally perform intra-frequency measurement or inter-frequency measurement, to reduce power consumption caused by determining whether the terminal device meets the first condition.

The criterion for performing neighboring cell measurement that is met is, for example, a criterion S. The criterion S means that power of a current serving cell of the terminal device is less than or equal to a power threshold for enabling neighboring cell measurement, signal quality of a current serving cell of the terminal device is less than or equal to a signal quality threshold for enabling neighboring cell measurement, or power of a current serving cell of the terminal device is less than or equal to a power threshold for enabling neighboring cell measurement, and signal quality of a current serving cell of the terminal device is less than or equal to a signal quality threshold for enabling neighboring cell measurement.

With reference to the first aspect, in a possible implementation of the first aspect, the first sub-condition includes:

a difference between first signal quality of one reference signal and second signal quality of the one reference signal is less than or equal to a first threshold, where the first signal quality of the one reference signal is reference signal quality corresponding to the one reference signal, and the second signal quality of the one reference signal is current signal quality of the one reference signal.

The first signal quality may be used as a reference value, and a change amount of the signal quality of the reference signal may be determined based on the first signal quality. If a change amount of signal quality of one reference signal is small, that is, less than or equal to the first threshold, it is considered that the signal quality of the reference signal meets the first sub-condition (or it is considered that second signal quality of the reference signal meets the first sub-condition). Alternatively, if a change amount of signal quality of one reference signal is large, for example, greater than the first threshold, it is considered that the signal quality of the reference signal does not meet the first sub-condition (or it is considered that second signal quality of the reference signal does not meet the first sub-condition).

With reference to the first aspect, in a possible implementation of the first aspect, the first information satisfies the following formula:

$$S=\Sigma_{i=1}^{N}(S_{ref,i}-S_i)^2 \text{ or } S=\Sigma_{i=1}^{N}|(S_{ref,i}-S_i)|, \text{ where}$$

S represents the first information, i represents a sequence number of an $i^{th}$ reference signal in the at least one reference signal, N represents the quantity of the at least one reference signal, $S_i$ represents second signal quality of the $i^{th}$ reference signal, and $S_{ref,i}$ represents first signal quality of the $i^{th}$ reference signal.

The first information may comprehensively represent a change amount of the at least one reference signal. If a change amount of the signal quality of the at least one reference signal is small, that is, less than or equal to a second threshold, it is considered that the signal quality of the reference signal meets the second sub-condition (or it is considered that second signal quality of the reference signal meets the second sub-condition). Alternatively, if a change amount of signal quality of one reference signal is large, for example, greater than a second threshold, it is considered that the signal quality of the reference signal does not meet the second sub-condition (or it is considered that second signal quality of the reference signal does not meet the second sub-condition). The change amount of the at least one reference signal is comprehensively considered, to improve accuracy of a determining result.

With reference to the first aspect, in a possible implementation of the first aspect, the second sub-condition includes:

S is less than or equal to a second threshold, or S/N is less than or equal to a second threshold.

Whether the second sub-condition is that S is less than or equal to the second threshold or S/N is less than or equal to the second threshold may be determined by the terminal device, configured by a network device, or specified in a protocol.

With reference to the first aspect, in a possible implementation of the first aspect, the method further includes:

After the terminal device completes cell selection or cell reselection, when the second signal quality of the one reference signal is higher than the first signal quality of the one reference signal, or when duration in which the terminal device does not meet the first condition reaches second duration, the terminal device sets the first signal quality of the one reference signal to the second signal quality of the one reference signal.

Each of the at least one reference signal may correspond to one piece of first signal quality. First signal quality corresponding to one reference signal may be used to determine whether second signal quality of the reference signal meets a corresponding condition, for example, determine whether the second signal quality of the reference signal meets the first sub-condition or the second sub-condition. Different reference signals may correspond to same first signal quality or different first signal quality. The at least one reference signal corresponds to at least one piece of first signal quality. The at least one piece of first signal quality may be preset. Herein, only an example is used to describe how to set the first signal quality. For example, first signal quality corresponding to one reference signal is initially equal to second signal quality of the reference signal. If the second signal quality of the reference signal may change, the first signal quality may also be reset accordingly. Setting the first signal quality corresponding to the reference signal to the second signal quality of the reference signal may be understood as setting a value of the first signal quality corresponding to the reference signal to a value of the second signal quality of the reference signal.

With reference to the first aspect, in a possible implementation of the first aspect, before the performing measurement according to a first measurement rule, the method further includes:

determining that duration since cell reselection is last performed is less than or equal to third duration.

With reference to the first aspect, in a possible implementation of the first aspect, before the performing measurement according to a first measurement rule, the method further includes:

determining that duration in which the terminal device performs intra-frequency measurement or inter-frequency measurement since cell selection or cell reselection is last performed is greater than or equal to the first duration.

In this embodiment of this application, the terminal device needs to use the first measurement rule on the premise that any one of the following conditions or any combination of the following plurality of conditions needs to be met: The terminal device meets the first condition, the duration since cell reselection is last performed is less than or equal to the third duration, or the duration in which the terminal device performs intra-frequency measurement or inter-frequency measurement since cell selection or cell reselection is last performed is greater than or equal to the first duration. For example, the terminal device may not perform intra-frequency measurement or inter-frequency measurement provided that the terminal device meets the first condition. Alternatively, the terminal device may use the first measurement rule if the terminal device meets the first condition, and the duration since cell reselection is last performed is less than or equal to the third duration. In this case, before using the first measurement rule, in addition to determining that the terminal device meets the first condition, the terminal device further needs to determine that the duration since cell reselection is last performed is less than or equal to the third duration. Alternatively, the terminal device may not perform intra-frequency measurement or inter-frequency measurement if the terminal device meets the first condition, the duration since cell reselection is last performed is less than or equal to the third duration, and the duration in which the terminal device performs intra-frequency measurement or inter-frequency measurement since cell selection or cell reselection is last performed is greater than or equal to the first duration. In this case, before using the first measurement rule, in addition to determining that the terminal device meets the first condition, the terminal device further needs to determine that the duration since cell reselection is last performed is less than or equal to the third duration, and needs to determine that the duration in which the terminal device performs intra-frequency measurement or inter-frequency measurement since cell selection or cell reselection is last performed is greater than or equal to the first duration.

According to a second aspect, a second communications method is provided. The method includes: based on signal quality of at least one reference signal of a serving cell of a terminal device, determining that the terminal device meets a second condition; and determining that the terminal device does not meet a relaxed measurement rule, where the at least one reference signal corresponds to at least one sending direction.

The method may be performed by a second communications apparatus. The second communications apparatus may be a communications device or a communications apparatus, for example, a chip system, that can support the communications device in implementing a function required in the method. For example, the second communications apparatus is a terminal apparatus. For example, the terminal apparatus is a terminal device, a chip system that is disposed in the terminal device and that is configured to implement functions of the terminal device, or another component configured to implement functions of the terminal device.

In this embodiment of this application, the terminal device may determine, based on the signal quality of the at least one reference signal of the serving cell of the terminal device, that the terminal device does not meet the relaxed measurement rule. The at least one reference signal corresponds to different sending directions, that is, direction information may be added when the terminal device determines whether the terminal device meets the relaxed measurement rule, so that accuracy of a determining result can be improved. If the terminal device does not meet the relaxed measurement rule, the terminal device may continue to perform a measurement process, so that when cell handover needs to be performed, a proper cell can be selected in a timely manner through measurement, to ensure a normal communication process of the terminal device, and reduce impact on the communication process of the terminal device.

With reference to the second aspect, in a possible implementation of the second aspect, the determining, based on signal quality of at least one reference signal of a serving cell of a terminal device, that the terminal device meets a second condition includes:
  if determining that signal quality of a first reference signal of the serving cell meets a third sub-condition, determining that the terminal device meets the second condition, where the signal quality of the first reference signal is higher than or equal to signal quality of another reference signal in the at least one reference signal; or
  if determining that signal quality of each of M reference signals in the at least one reference signal meets a third sub-condition, determining that the terminal device meets the second condition, where M is an integer greater than or equal to 1, and M is less than or equal to a quantity of the at least one reference signal; or
  obtaining first information based on the signal quality of the at least one reference signal, and if determining that the first information meets a fourth sub-condition, determining that the terminal device meets the second condition.

For example, the first reference signal may be any one of the at least one reference signal. For example, only one of the at least one reference signal needs to be randomly selected, and it may be considered that the terminal device meets the second condition, provided that signal quality of the reference signal meets the third sub-condition. Such a manner of determining that the terminal device meets the second condition is simple. The terminal device only needs to randomly select one reference signal to obtain signal quality of the reference signal, and determines whether the signal quality of the reference signal meets the third sub-condition. Therefore, a workload of the terminal device is light, and power consumption is low. Alternatively, the first reference signal may be a reference signal with highest signal quality in the at least one reference signal, that is, the signal quality of the first reference signal is higher than or equal to signal quality of a reference signal other than the first reference signal in the at least one reference signal. This may also mean that a beam used to send the first reference signal is an optimal beam in at least one beam. A change of an optimal reference signal (that is, a reference signal with highest signal quality, an optimal beam, or a reference signal sent through an optimal beam) is more sensitive to movement of the terminal device, and therefore the optimal reference signal can better represent a movement status of the terminal device. If signal quality of the optimal reference signal meets the third sub-condition, it may be considered that the terminal device meets the second condition. The terminal device needs to determine, based on only one reference signal, that the terminal device meets the second condition, but does not need to process excessive reference signals, to help reduce a workload of the terminal device.

Alternatively, the terminal device may determine, based on signal quality of the M reference signals, that the terminal device meets the second condition, that is, the terminal device may consider second signal quality of a plurality of reference signals, and determine whether the second signal quality of the plurality of reference signals meets the third sub-condition, to improve accuracy of a determining result.

Alternatively, the terminal device may obtain the first information based on the at least one piece of signal quality of the at least one reference signal, and determine whether the first information meets the fourth sub-condition, that is, comprehensively determine whether the signal quality of the at least one reference signal meets the fourth sub-condition, to improve accuracy of a determining result.

With reference to the second aspect, in a possible implementation of the second aspect, the method further includes:
  based on the signal quality of the at least one reference signal, determining that the terminal device is located at a center location of the serving cell of the terminal device, or determining that the terminal device does not meet a criterion for performing neighboring cell measurement.

If the terminal device determines that the terminal device is located at an edge location of the cell, the terminal device may continue to determine whether the terminal device meets the second condition. The terminal device at the edge of the cell may be in a moving state, for example, a probability of performing cell handover or reselection is high. A proper cell needs to be selected through measurement, that is, the terminal device at the edge of the cell may need to perform measurement. Therefore, the terminal device at the edge of the cell is not suitable for using the relaxed measurement rule. In this way, if the terminal device is located at the edge location of the cell, the terminal device may determine whether the terminal device meets the second condition. If the terminal device meets the second condition, the terminal device may not use the relaxed measurement rule, so that the technical solution provided in this embodiment of this application can be applied to a terminal device that has more requirements.

The criterion for performing neighboring cell measurement that is not met is, for example, a criterion S. The criterion S means that power of a current serving cell of the terminal device is less than or equal to a power threshold for enabling neighboring cell measurement. In this case, the criterion S is not met if the power of the current serving cell of the terminal device is greater than the power threshold for enabling neighboring cell measurement. Alternatively, the criterion S means that signal quality of a current serving cell of the terminal device is less than or equal to a signal quality threshold for enabling neighboring cell measurement. In this case, the criterion S is not met if the signal quality of the current serving cell of the terminal device is greater than the signal quality threshold for enabling neighboring cell measurement. Alternatively, the criterion S means that power of a current serving cell of the terminal device is less than or equal to a power threshold for enabling neighboring cell measurement, and signal quality of the current serving cell of the terminal device is less than or equal to a signal quality threshold for enabling neighboring cell measurement. In this case, the criterion S is not met if the power of the current serving cell of the terminal device is greater than the power threshold for enabling neighboring cell measurement, the signal quality of the current serving cell of the terminal device is greater than the signal quality threshold for enabling neighboring cell measurement, or the power of the current serving cell of the terminal device is greater than the power threshold for enabling neighboring cell measurement, and the signal quality of the current serving cell of the terminal device is greater than the signal quality threshold for enabling neighboring cell measurement.

With reference to the second aspect, in a possible implementation of the second aspect, the third sub-condition includes:
  a difference between first signal quality of one reference signal and second signal quality of the one reference signal is greater than or equal to a first threshold, where the first signal quality of the one reference signal is reference signal quality corresponding to the one reference signal, and the second signal quality of the one reference signal is current signal quality of the one reference signal.

The first signal quality may be used as a reference value, and a change amount of the signal quality of the reference signal may be determined based on the first signal quality. If a change amount of signal quality of one reference signal is large, that is, greater than or equal to the first threshold, it is considered that the signal quality of the reference signal meets the third sub-condition (or it is considered that second signal quality of the reference signal meets the third sub-condition). Alternatively, if a change amount of signal quality of one reference signal is small, for example, less than the first threshold, it is considered that the signal quality of the reference signal does not meet the third sub-condition (or it is considered that second signal quality of the reference signal does not meet the third sub-condition).

With reference to the second aspect, in a possible implementation of the second aspect, the first information satisfies the following formula:

$$S=\sum_{i=1}^{N}(S_{ref,i}-S_i)^2 \text{ or } S=\sum_{i=1}^{N}|(S_{ref,i}-S_i)|, \text{ where}$$

S represents the first information, i represents a sequence number of an $i^{th}$ reference signal in the at least one reference signal, N represents the quantity of the at least one reference signal, $S_i$ represents second signal quality of the $i^{th}$ reference signal, and $S_{ref,i}$ represents first signal quality of the $i^{th}$ reference signal.

The first information may comprehensively represent a change amount of the at least one reference signal. If a change amount of the signal quality of the at least one reference signal is large, that is, greater than or equal to a second threshold, it is considered that the signal quality of the reference signal meets the fourth sub-condition (or it is considered that second signal quality of the reference signal meets the fourth sub-condition). Alternatively, if a change amount of signal quality of one reference signal is small, for example, less than a second threshold, it is considered that the signal quality of the reference signal does not meet the fourth sub-condition (or it is considered that second signal quality of the reference signal does not meet the fourth sub-condition). The change amount of the at least one reference signal is comprehensively considered, to improve accuracy of a determining result.

With reference to the second aspect, in a possible implementation of the second aspect, the fourth sub-condition includes:

S is greater than or equal to a second threshold, or S/N is greater than or equal to a second threshold.

Whether the fourth sub-condition is that S is greater than or equal to the second threshold or S/N is greater than or equal to the second threshold may be determined by the terminal device, configured by a network device, or specified in a protocol.

The method further includes:

After the terminal device completes cell selection or cell reselection, when the second signal quality of the one reference signal is higher than the first signal quality of the one reference signal, or when duration in which the terminal device meets the second condition reaches first duration,
 the terminal device sets the second signal quality of the one reference signal to the first signal quality of the one reference signal.

Each of the at least one reference signal may correspond to one piece of first signal quality. First signal quality corresponding to one reference signal may be used to determine whether second signal quality of the reference signal meets a corresponding condition, for example, determine whether the second signal quality of the reference signal meets the third sub-condition or the fourth sub-condition. Different reference signals may correspond to same first signal quality or different first signal quality. The at least one reference signal corresponds to at least one piece of first signal quality. The at least one piece of first signal quality may be preset. Herein, only an example is used to describe how to set the first signal quality. For example, first signal quality corresponding to one reference signal is initially equal to second signal quality of the reference signal. If the second signal quality of the reference signal may change, the first signal quality may also be reset accordingly. Setting the first signal quality corresponding to the reference signal to the second signal quality of the reference signal may be understood as setting a value of the first signal quality corresponding to the reference signal to a value of the second signal quality of the reference signal.

With reference to the second aspect, in a possible implementation of the second aspect, the method further includes:

The terminal device performs intra-frequency measurement or inter-frequency measurement.

If the terminal device determines that the terminal device does not meet the relaxed measurement rule, the terminal device may continue to perform a normal measurement process. For example, the terminal device may perform intra-frequency measurement or inter-frequency measurement. How to perform a normal measurement process is not limited in this embodiment of this application.

According to a third aspect, a communications apparatus is provided. For example, the communications apparatus is the first communications apparatus described above. The first communications apparatus is configured to perform the method according to any one of the first aspect or the possible implementations of the first aspect. For example, the first communications apparatus may include a module configured to perform the method according to any one of the first aspect or the possible implementations of the first aspect, for example, include a processing module. Optionally, the first communications apparatus may further include a transceiver module. For example, the first communications apparatus is a communications device, or is a chip or another component disposed in the communications device. For example, the communications device is a terminal device. An example in which the first communications apparatus is the terminal device is used below.

The processing module is configured to determine, based on signal quality of at least one reference signal of a serving cell, that the terminal device meets a first condition, where the at least one reference signal corresponds to at least one sending direction.

The processing module is further configured to perform measurement according to a first measurement rule.

With reference to the third aspect, in a possible implementation of the third aspect, the processing module is configured to determine, based on the signal quality of the at least one reference signal of the serving cell of the terminal device in the following manner, that the terminal device meets the first condition:
 if determining that signal quality of a first reference signal of the serving cell meets a first sub-condition in first duration, determining that the terminal device meets the first condition, where the signal quality of the first reference signal is higher than signal quality of another reference signal in the at least one reference signal; or
 if determining that signal quality of each of M reference signals in the at least one reference signal meets a first sub-condition in first duration, determining that the terminal device meets the first condition, where M is an integer greater than or equal to 1, and M is less than or equal to a quantity of the at least one reference signal; or obtaining first information based on the signal quality of the at least one reference signal, and if determining that the first information meets a second sub-condition in first duration, determining that the terminal device meets the first condition.

With reference to the third aspect, in a possible implementation of the third aspect, the processing module is further configured to: based on the signal quality of the at least one reference signal, determine that the terminal device is located at an edge location of the serving cell of the terminal device, or determine that the terminal device meets a criterion for performing neighboring cell measurement.

With reference to the third aspect, in a possible implementation of the third aspect, the first sub-condition includes:

a difference between first signal quality of one reference signal and second signal quality of the one reference signal is less than or equal to a first threshold, where the first signal quality of the one reference signal is reference signal quality corresponding to the one reference signal, and the second signal quality of the one reference signal is current signal quality of the one reference signal.

With reference to the third aspect, in a possible implementation of the third aspect, the first information satisfies the following formula:

$$S=\Sigma_{i=1}^{N}(S_{ref,i}-S_i)^2 \text{ or } S=\Sigma_{i=1}^{N}|(S_{ref,i}-S_i)|, \text{ where}$$

S represents the first information, i represents a sequence number of an $i^{th}$ reference signal in the at least one reference signal, N represents the quantity of the at least one reference signal, $S_i$ represents second signal quality of the $i^{th}$ reference signal, and $S_{ref,i}$ represents first signal quality of the $i^{th}$ reference signal.

With reference to the third aspect, in a possible implementation of the third aspect, the second sub-condition includes:

S is less than or equal to a second threshold, or S/N is less than or equal to a second threshold.

With reference to the third aspect, in a first possible implementation of the third aspect, the processing module is further configured to:

after the terminal device completes cell selection or cell reselection, when the second signal quality of the one reference signal is higher than the first signal quality of the one reference signal, or when duration in which the terminal device does not meet the first condition reaches second duration, set the first signal quality of the one reference signal to the second signal quality of the one reference signal.

With reference to the third aspect, in a possible implementation of the third aspect, the processing module is further configured to: before performing measurement according to the first measurement rule, determine that duration since cell reselection is last performed is less than or equal to third duration.

With reference to the third aspect, in a possible implementation of the third aspect, the processing module is further configured to: before performing measurement according to the first measurement rule, determine that duration in which the terminal device performs intra-frequency measurement or inter-frequency measurement since cell selection or cell reselection is last performed is greater than or equal to the first duration.

For technical effects achieved in the third aspect or the possible implementations of the third aspect, refer to the descriptions of the technical effects achieved in the first aspect or the corresponding implementations of the first aspect.

According to a fourth aspect, a communications apparatus is provided. For example, the communications apparatus is the second communications apparatus described above. The first communications apparatus is configured to perform the method according to any one of the second aspect or the possible implementations of the second aspect. For example, the first communications apparatus may include a module configured to perform the method according to any one of the second aspect or the possible implementations of the second aspect, for example, include a processing module. Optionally, the first communications apparatus may further include a transceiver module. For example, the first communications apparatus is a communications device, or is a chip or another component disposed in the communications device. For example, the communications device is a terminal device. An example in which the first communications apparatus is the terminal device is used below.

Based on signal quality of at least one reference signal of a serving cell of the terminal device, the processing module is configured to determine that the terminal device meets a second condition; and the processing module is further configured to determine that the terminal device does not meet a relaxed measurement rule, where the at least one reference signal corresponds to at least one sending direction.

With reference to the fourth aspect, in a possible implementation of the fourth aspect, the processing module is configured to determine, based on the signal quality of the at least one reference signal of the serving cell of the terminal device in the following manner, that the terminal device meets the second condition:

if determining that signal quality of a first reference signal of the serving cell meets a third sub-condition, determining that the terminal device meets the second condition, where the signal quality of the first reference signal is higher than or equal to signal quality of another reference signal in the at least one reference signal; or if determining that signal quality of each of M reference signals in the at least one reference signal meets a third sub-condition, determining that the terminal device meets the second condition, where M is an integer greater than or equal to 1, and M is less than or equal to a quantity of the at least one reference signal; or obtaining first information based on the signal quality of the at least one reference signal, and if determining that the first information meets a fourth sub-condition, determining that the terminal device meets the second condition.

With reference to the fourth aspect, in a possible implementation of the fourth aspect, the processing module is further configured to: based on the signal quality of the at least one reference signal, determine that the terminal device is located at a center location of the serving cell of the terminal device, or determine that the terminal device does not meet a criterion for performing neighboring cell measurement.

With reference to the fourth aspect, in a possible implementation of the fourth aspect, the third sub-condition includes:

a difference between first signal quality of one reference signal and second signal quality of the one reference signal is greater than or equal to a first threshold, where the first signal quality of the one reference signal is reference signal quality corresponding to the one reference signal, and the second signal quality of the one reference signal is current signal quality of the one reference signal.

With reference to the fourth aspect, in a possible implementation of the fourth aspect, the first information satisfies the following formula:

$S=\sum_{i=1}^{N}(S_{ref,i}-S_i)^2$ or $S=\sum_{i=1}^{N}|(S_{ref,i}-S_i)|$, where S represents the first information, i represents a sequence number of an $i^{th}$ reference signal in the at least one reference signal, N represents the quantity of the at least one reference signal, $S_i$ represents second signal quality of the $i^{th}$ reference signal, and $S_{ref,i}$ represents first signal quality of the $i^{th}$ reference signal.

With reference to the fourth aspect, in a possible implementation of the fourth aspect, the fourth sub-condition includes:

S is greater than or equal to a second threshold, or S/N is greater than or equal to a second threshold.

With reference to the fourth aspect, in a possible implementation of the fourth aspect, the processing module is further configured to:

after the terminal device completes cell selection or cell reselection, when the second signal quality of the one reference signal is higher than the first signal quality of the one reference signal, or when duration in which the terminal device meets the second condition reaches first duration, set the second signal quality of the one reference signal to the first signal quality of the one reference signal.

With reference to the fourth aspect, in a possible implementation of the fourth aspect, the processing module is further configured to perform intra-frequency measurement or inter-frequency measurement. For example, the processing module is further configured to: when determining that the terminal device does not meet the relaxed measurement rule or after determining that the terminal device does not meet the relaxed measurement rule, perform intra-frequency measurement or inter-frequency measurement.

For technical effects achieved in the fourth aspect or the possible implementations of the fourth aspect, refer to the descriptions of the technical effects achieved in the second aspect or the corresponding implementations of the second aspect.

According to a fifth aspect, a communications apparatus is provided. For example, the communications apparatus is the first communications apparatus described above. The communications apparatus includes a processor. Optionally, the communications apparatus may further include a transceiver. The processor and the transceiver are coupled to each other, and are configured to implement the method according to the first aspect or the possible implementations of the first aspect. Optionally, the first communications apparatus may further include a memory. The processor, the memory, and the transceiver are coupled to each other, and are configured to implement the method according to the first aspect or the possible implementations of the first aspect. For example, the first communications apparatus is a communications device, or is a chip or another component disposed in the communications device. For example, the communications device is a terminal device. An example in which the first communications apparatus is the terminal device is used below. If the first communications apparatus is a communications device, the transceiver is implemented, for example, by using an antenna, a feeder, and a codec in the communications device. Alternatively, if the first communications apparatus is a chip disposed in a communications device, the transceiver is, for example, a communications interface in the chip, and the communications interface is connected to a radio frequency transceiver component in the communications device, to implement information receiving and sending by using the radio frequency transceiver component.

The communications interface is configured to communicate with another apparatus.

The processor is configured to: determine, based on signal quality of at least one reference signal of a serving cell, that the terminal device meets a first condition, and perform measurement according to a first measurement rule, where the at least one reference signal corresponds to at least one sending direction.

With reference to the fifth aspect, in a possible implementation of the fifth aspect, the processor is configured to determine, based on the signal quality of the at least one reference signal of the serving cell of the terminal device in the following manner, that the terminal device meets the first condition:

if determining that signal quality of a first reference signal of the serving cell meets a first sub-condition in first duration, determining that the terminal device meets the first condition, where the signal quality of the first reference signal is higher than signal quality of another reference signal in the at least one reference signal; or if determining that signal quality of each of M reference signals in the at least one reference signal meets a first sub-condition in first duration, determining that the terminal device meets the first condition, where M is an integer greater than or equal to 1, and M is less than or equal to a quantity of the at least one reference signal; or obtaining first information based on the signal quality of the at least one reference signal, and if determining that the first information meets a second sub-condition in first duration, determining that the terminal device meets the first condition.

With reference to the fifth aspect, in a possible implementation of the fifth aspect, the processor is further configured to: based on the signal quality of the at least one reference signal, determine that the terminal device is located at an edge location of the serving cell of the terminal device, or determine that the terminal device meets a criterion for performing neighboring cell measurement.

With reference to the fifth aspect, in a possible implementation of the fifth aspect, the first sub-condition includes:

a difference between first signal quality of one reference signal and second signal quality of the one reference signal is less than or equal to a first threshold, where the first signal quality of the one reference signal is reference signal quality corresponding to the one reference signal, and the second signal quality of the one reference signal is current signal quality of the one reference signal.

With reference to the fifth aspect, in a possible implementation of the fifth aspect, the first information satisfies the following formula:

$S=\sum_{i=1}^{N}(S_{ref,i}-S_i)^2$ or $S=\sum_{i=1}^{N}|(S_{ref,i}-S_i)|$, where S represents the first information, i represents a sequence number of an $i^{th}$ reference signal in the at least one reference signal, N represents the quantity of the at least one reference signal, $S_i$ represents second signal quality of the $i^{th}$ reference signal, and $S_{ref,i}$ represents first signal quality of the $i^{th}$ reference signal.

With reference to the fifth aspect, in a possible implementation of the fifth aspect, the second sub-condition includes:

S is less than or equal to a second threshold, or S/N is less than or equal to a second threshold.

With reference to the fifth aspect, in a possible implementation of the fifth aspect, the processor is further configured to:

after the terminal device completes cell selection or cell reselection, when the second signal quality of the one reference signal is higher than the first signal quality of the one reference signal, or when duration in which the terminal device does not meet the first condition reaches second duration, set the first signal quality of the one reference signal to the second signal quality of the one reference signal.

With reference to the fifth aspect, in a possible implementation of the fifth aspect, the processor is further configured to: before performing measurement according to the first measurement rule, determine that duration since cell reselection is last performed is less than or equal to third duration.

With reference to the fifth aspect, in a possible implementation of the fifth aspect, the processor is further configured to: before performing measurement according to the first measurement rule, determine that duration in which the terminal device performs intra-frequency measurement or inter-frequency measurement since cell selection or cell reselection is last performed is greater than or equal to the first duration.

For technical effects achieved in the fifth aspect or the possible implementations of the fifth aspect, refer to the descriptions of the technical effects achieved in the first aspect or the corresponding implementations of the first aspect.

According to a sixth aspect, a communications apparatus is provided. For example, the communications apparatus is the second communications apparatus described above. The communications apparatus includes a processor. Optionally, the communications apparatus may further include a transceiver. The processor and the transceiver are coupled to each other, and are configured to implement the method according to the second aspect or the possible implementations of the second aspect. Optionally, the first communications apparatus may further include a memory. The processor, the memory, and the transceiver are coupled to each other, and are configured to implement the method according to the second aspect or the possible implementations of the second aspect. For example, the first communications apparatus is a communications device, or is a chip or another component disposed in the communications device. For example, the communications device is a terminal device. An example in which the second communications apparatus is the terminal device is used below. If the second communications apparatus is a communications device, the transceiver is implemented, for example, by using an antenna, a feeder, and a codec in the communications device. Alternatively, if the first communications apparatus is a chip disposed in a communications device, the transceiver is, for example, a communications interface in the chip, and the communications interface is connected to a radio frequency transceiver component in the communications device, to implement information receiving and sending by using the radio frequency transceiver component.

The communications interface is configured to communicate with another apparatus.

The processor is configured to: based on signal quality of at least one reference signal of a serving cell of the terminal device, determine that the terminal device meets a second condition, and determine that the terminal device does not meet a relaxed measurement rule, where the at least one reference signal corresponds to at least one sending direction.

With reference to the sixth aspect, in a possible implementation of the sixth aspect, the processor is configured to determine, based on the signal quality of the at least one reference signal of the serving cell of the terminal device in the following manner, that the terminal device meets the second condition:

if determining that signal quality of a first reference signal of the serving cell meets a third sub-condition, determining that the terminal device meets the second condition, where the signal quality of the first reference signal is higher than or equal to signal quality of another reference signal in the at least one reference signal; or if determining that signal quality of each of M reference signals in the at least one reference signal meets a third sub-condition, determining that the terminal device meets the second condition, where M is an integer greater than or equal to 1, and M is less than or equal to a quantity of the at least one reference signal; or obtaining first information based on the signal quality of the at least one reference signal, and if determining that the first information meets a fourth sub-condition, determining that the terminal device meets the second condition.

With reference to the sixth aspect, in a possible implementation of the sixth aspect, the processor is further configured to: based on the signal quality of the at least one reference signal, determine that the terminal device is located at a center location of the serving cell of the terminal device, or determine that the terminal device does not meet a criterion for performing neighboring cell measurement.

With reference to the sixth aspect, in a possible implementation of the sixth aspect, the third sub-condition includes:

a difference between first signal quality of one reference signal and second signal quality of the one reference signal is greater than or equal to a first threshold, where the first signal quality of the one reference signal is reference signal quality corresponding to the one reference signal, and the second signal quality of the one reference signal is current signal quality of the one reference signal.

With reference to the sixth aspect, in a possible implementation of the sixth aspect, the first information satisfies the following formula:

$$S=\sum_{i=1}^{N}(S_{ref,i}-S_i)^2 \text{ or } S=\sum_{i=1}^{N}|(S_{ref,i}-S_i)|, \text{ where}$$

S represents the first information, i represents a sequence number of an $i^{th}$ reference signal in the at least one reference signal, N represents the quantity of the at least one reference signal, $S_i$ represents second signal quality of the $i^{th}$ reference signal, and $S_{ref,i}$ represents first signal quality of the $i^{th}$ reference signal.

With reference to the sixth aspect, in a possible implementation of the sixth aspect, the fourth sub-condition includes:

S is greater than or equal to a second threshold, or S/N is greater than or equal to a second threshold.

With reference to the sixth aspect, in a possible implementation of the sixth aspect, the processor is further configured to:

after the terminal device completes cell selection or cell reselection, when the second signal quality of the one reference signal is higher than the first signal quality of the one reference signal, or when duration in which the terminal device meets the second condition reaches first duration, set the second signal quality of the one reference signal to the first signal quality of the one reference signal.

With reference to the sixth aspect, in a possible implementation of the sixth aspect, the processor is further configured to perform intra-frequency measurement or inter-frequency measurement. For example, the processor is further configured to: when determining that the terminal device does not meet the relaxed measurement rule or after determining that the terminal device does not meet the relaxed measurement rule, perform intra-frequency measurement or inter-frequency measurement.

For technical effects achieved in the sixth aspect or the possible implementations of the sixth aspect, refer to the descriptions of the technical effects achieved in the second aspect or the corresponding implementations of the second aspect.

According to a seventh aspect, a communications apparatus is provided. The communications apparatus may be the first communications apparatus in the foregoing method designs. For example, the first communications apparatus is a chip disposed in a communications device. For example, the communications device is a terminal device. The communications apparatus includes: a communications interface, configured to: receive and send information, or configured to communicate with another apparatus, and a processor, where the processor is coupled to the communications interface. Optionally, the communications apparatus may further include a memory, configured to store computer executable program code. Alternatively, the communications apparatus may not include a memory, and the memory may be located outside the communications apparatus. The program code stored in the memory includes instructions. When the processor executes the instructions, the communications apparatus is enabled to perform the method according to any one of the first aspect or the possible implementations of the first aspect.

If the first communications apparatus is a communications device, the communications interface may be a transceiver in the first communications apparatus, for example, implemented by using an antenna, a feeder, and a codec in the communications apparatus. Alternatively, if the first communications apparatus is a chip disposed in a communications device, the communications interface may be an input/output interface in the chip, for example, an input/output pin.

According to an eighth aspect, a communications apparatus is provided. The communications apparatus may be the second communications apparatus in the foregoing method designs. For example, the second communications apparatus is a chip disposed in a communications device. For example, the communications device is a terminal device. The communications apparatus includes: a communications interface, configured to: receive and send information, or configured to communicate with another apparatus, and a processor, where the processor is coupled to the communications interface. Optionally, the communications apparatus may further include a memory, configured to store computer executable program code. Alternatively, the communications apparatus may not include a memory, and the memory may be located outside the communications apparatus. The program code stored in the memory includes instructions. When the processor executes the instructions, the communications apparatus is enabled to perform the method according to any one of the second aspect or the possible implementations of the second aspect.

If the second communications apparatus is a communications device, the communications interface may be a transceiver in the second communications apparatus, for example, implemented by using an antenna, a feeder, and a codec in the second communications apparatus. Alternatively, if the second communications apparatus is a chip disposed in a communications device, the communications interface may be an input/output interface in the chip, for example, an input/output pin.

According to a ninth aspect, a communications system is provided. The communications system includes the communications apparatus according to the third aspect, the communications apparatus according to the fifth aspect, or the communications apparatus according to the seventh aspect, and/or the communications system includes the communications apparatus according to the fourth aspect, the communications apparatus according to the sixth aspect, or the communications apparatus according to the eighth aspect.

According to a tenth aspect, a computer storage medium is provided. The computer-readable storage medium is configured to store computer instructions. When the computer instructions are run on a computer, the computer is enabled to perform the method according to any one of the first aspect or the possible implementations of the first aspect.

According to an eleventh aspect, a computer storage medium is provided. The computer-readable storage medium is configured to store computer instructions. When the computer instructions are run on a computer, the computer is enabled to perform the method according to any one of the second aspect or the possible implementations of the second aspect.

According to a twelfth aspect, a computer program product including instructions is provided. The computer program product is configured to store computer instructions. When the computer instructions are run on a computer, the computer is enabled to perform the method according to any one of the first aspect or the possible implementations of the first aspect.

According to a thirteenth aspect, a computer program product including instructions is provided. The computer program product is configured to store computer instructions. When the computer instructions are run on a computer, the computer is enabled to perform the method according to any one of the second aspect or the possible implementations of the second aspect.

In the embodiments of this application, the at least one reference signal corresponds to different sending directions, that is, direction information may be added when a movement status of the terminal device is determined, so that accuracy of a determining result can be improved, and impact on a communication process of the terminal device can be reduced.

DESCRIPTION OF EMBODIMENTS

Figure 1:
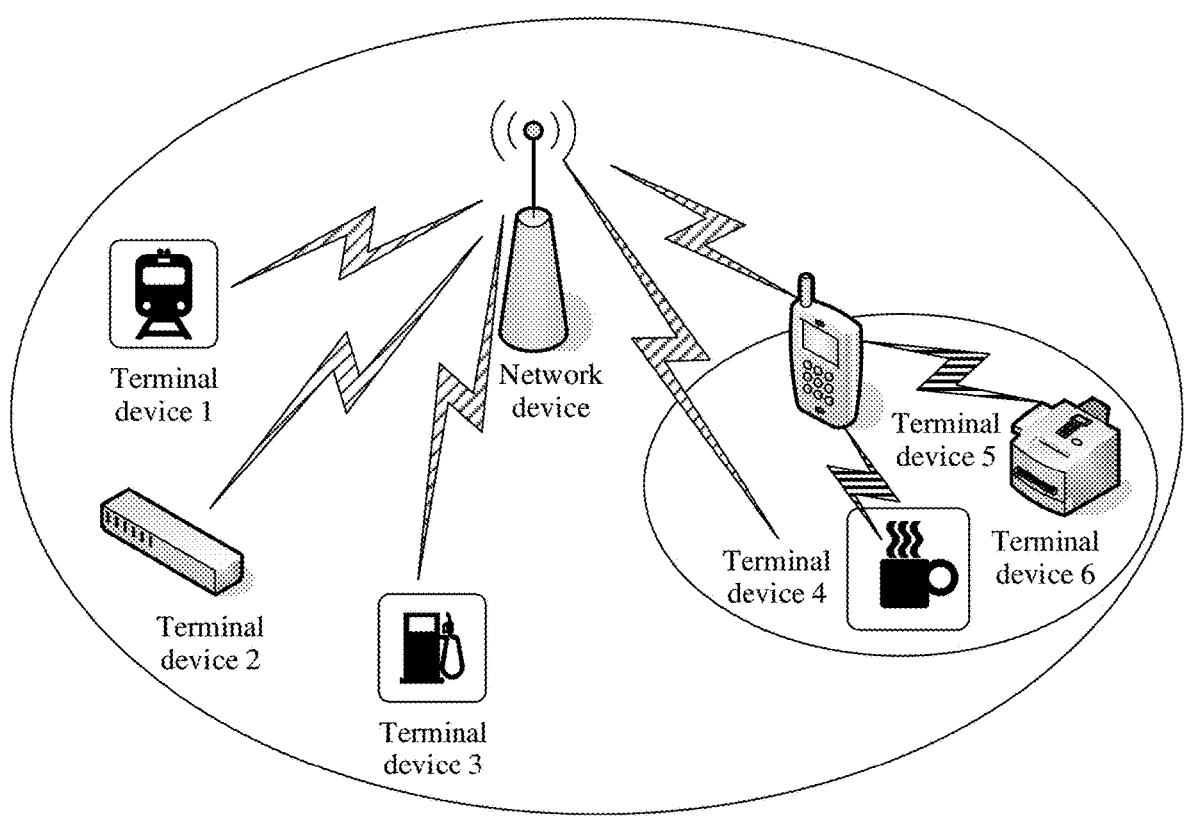
FIG. 1 is a schematic diagram of an application scenario according to an embodiment of this application.

To make the objectives, the technical solutions, and advantages of the embodiments of this application clearer, the following further describes the embodiments of this application in detail with reference to the accompanying drawings.

The following describes some terms in the embodiments of this application, to help a person skilled in the art have a better understanding.

(1) Terminal device: The terminal device includes a device that provides a voice and/or data connectivity for a user. For example, the terminal device includes a device that provides a voice for the user, includes a device that provides data connectivity for the user, or includes a device that provides a voice and data connectivity for the user. For example, the terminal device may include a handheld device having a wireless connection function or a processing device connected to a wireless modem. The terminal device may communicate with a core network through a radio access network (RAN), and exchange a voice or data with the RAN, or exchange a voice and data with the RAN. The terminal device may include user equipment (UE), a wireless terminal device, a mobile terminal device, a device-to-device (D2D) communications terminal device, a vehicle-to-everything (V2X) terminal device, a machine-to-machine/machine type communication (M2M/MTC) terminal device, an internet of things (IoT) terminal device, a subscriber unit, a subscriber station, a mobile station, a remote, an access point, a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communications service (PCS) phone, a cordless telephone set, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

As an example instead of a limitation, in the embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on a body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or some of functions without depending on smartphones, for example, smart watches or smart glasses, and include devices that focus only on one type of application function and need to collaboratively work with other devices such as smartphones, for example, various smart bands, smart helmets, or smart jewelry for monitoring physical signs.

However, if the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (OBUs).

In the embodiments of this application, the terminal device may alternatively include a relay. For example, it may be understood that a device that can perform data communication with a base station may be considered as the terminal device.

(2) Network device: The network device includes, for example, an access network (AN) device such as a base station (for example, an access point), and may be a device that communicates with a wireless terminal device over an air interface through one or more cells in an access network. Alternatively, for example, a network device in a vehicle-to-everything (V2X) technology is a road side unit (RSU). The base station may be configured to mutually convert a received over-the-air frame and an IP packet and serve as a router between a terminal device and a remaining portion of the access network, where the remaining portion of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or eNodeB) in a long term evolution (LTE) system or a long term evolution-advanced (LTE-A) system, may include a next generation NodeB (gNB) in a $5^{th}$ generation (5G) mobile communications technology new radio (NR) system (also briefly referred to as an NR system), or may include a centralized unit (CU) and a distributed unit (DU) in a cloud radio access network (Cloud RAN) system. This is not limited in the embodiments of this application.

In addition, the network device may further include a core network device. However, the embodiments of this application does not involve the core network device, but mainly involves interaction between the access network device and the terminal device. Therefore, the network device in the embodiments of this application may be the access network device.

(3) Beam: The beam means that a base station emits energy to a range in a direction within a specific time period, to form an energy area similar to the beam, so as to provide a communication service for a terminal device in the direction.

(4) Terms: The terms "system" and "network" may be used interchangeably in the embodiments of this application. "At least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" usually indicates an "or" relationship between the associated objects. "At least one of the following" or a similar expression thereof indicates any combination of the following, including any combination of one or more of the following. For example, at least one of a, b, or c may represent: a, b, c, a and b, a and c, b and c, or a, b, and c, where a, b, and c may be singular or plural.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects. For example, a first condition and a second condition are merely used to distinguish between different conditions, but do not indicate different content, priorities, importance, or the like of the two conditions.

The foregoing describes some noun concepts in the embodiments of this application. The following describes technical features in the embodiments of this application.

In a wireless communications system, a terminal device needs to periodically measure signal quality of a serving cell. If the signal quality of the serving cell is less than a specific threshold, the terminal device may perform intra-frequency measurement or inter-frequency measurement, so that when signal quality of an intra-frequency cell or an inter-frequency cell meets a specific condition, the terminal device may perform cell reselection to reselect another cell.

However, in some scenarios, a location of the terminal device may be fixed. For example, in a scenario such as internet of things (IoT) or machine type communication (MTC), locations of some terminal devices are fixed. For a terminal device with a fixed location, a serving cell and a neighboring cell are also fixed. Even if the terminal device performs periodic measurement, measurement results may differ slightly. In this case, when the terminal device performs periodic measurement, it is equivalent to performing an invalid operation. Consequently, power consumption of the terminal device is high.

Currently, to save energy for the terminal device, a relaxed measurement rule is introduced. Assuming that a change amount of signal quality that is of a serving cell and that is measured by the terminal device does not exceed a threshold within a period of time (for example, 5 minutes), the terminal device may consider that the terminal device meets the relaxed measurement rule. When the relaxed measurement rule is met, the terminal device may relax intra-frequency measurement or inter-frequency measurement. For example, the terminal device may not perform intra-frequency measurement or inter-frequency measurement within a long period of time (for example, 24 hours), to save power.

However, a currently used determining manner of determining whether the terminal device meets the relaxed measurement rule is inaccurate. For example, when the terminal device moves in a circle around a base station, the change of the signal quality of the serving cell of the terminal device is small. If the change of the signal quality of the serving cell of the terminal device does not exceed the threshold, the terminal device considers that the terminal device meets the relaxed measurement rule, and therefore the terminal device may not perform intra-frequency measurement or inter-frequency measurement within a long period of time. In this case, if the terminal device moves to an edge of the serving cell at a moment, but because the terminal device does not perform intra-frequency measurement or inter-frequency measurement, cell reselection cannot be performed, and subsequent communication service execution is affected.

It can be learned that, because the manner of determining whether the terminal device meets the relaxed measurement rule is inaccurate, communication with the terminal device may be affected.

In view of this, technical solutions in the embodiments of this application are provided. In the embodiments of this application, it may be determined, based on signal quality of at least one reference signal of the serving cell of the terminal device, that the terminal device may not perform intra-frequency measurement or inter-frequency measurement, that is, a movement status of the terminal device may be determined based on the signal quality of the at least one reference signal. For example, it may be determined that the terminal device is in a static state or is not in a moving state. Therefore, the terminal device may not perform intra-frequency measurement or inter-frequency measurement. The at least one reference signal corresponds to at least one sending direction, that is, direction information may be added when the movement status of the terminal device is determined, so that accuracy of a determining result can be improved, and impact on a communication process of the terminal device can be reduced.

FIG. 1 shows an application scenario according to an embodiment of this application. FIG. 1 includes a network device and a terminal device. There may be a plurality of types of terminal devices. For example, in FIG. 1, a terminal device 1 is a television, a terminal device 2 is a router, a terminal device 3 is a hot kettle, a terminal device 4 is a water cup, a terminal device 5 is a mobile phone, and a terminal device 6 is a printer. The terminal device 5 may be further used as a relay between the terminal device 4 and the terminal device 6. Uplink communication between the terminal device 4 and the terminal device 6 needs to be forwarded by the relay, that is, the terminal device 4 first sends an uplink signal to the terminal device 5, and the terminal device 5 forwards the received uplink signal of the terminal device 4 to the network device, so that the network device can receive the uplink signal from the terminal device 4. The same is true for the terminal device 6. However, for downlink communication, both the terminal device 4 and the terminal device 6 may directly receive a downlink signal from the network device without forwarding by the relay.

The network device in FIG. 1 is, for example, a base station. The network device may correspond to different devices in different systems. For example, the network device may correspond to a network device, for example, an eNB, in a $4^{th}$ generation (4G) mobile communications technology system, and may correspond to a network device, for example, a gNB, in a 5G system.

The following describes, with reference to the accompanying drawings, the technical solutions provided in the embodiments of this application.

Figure 2:
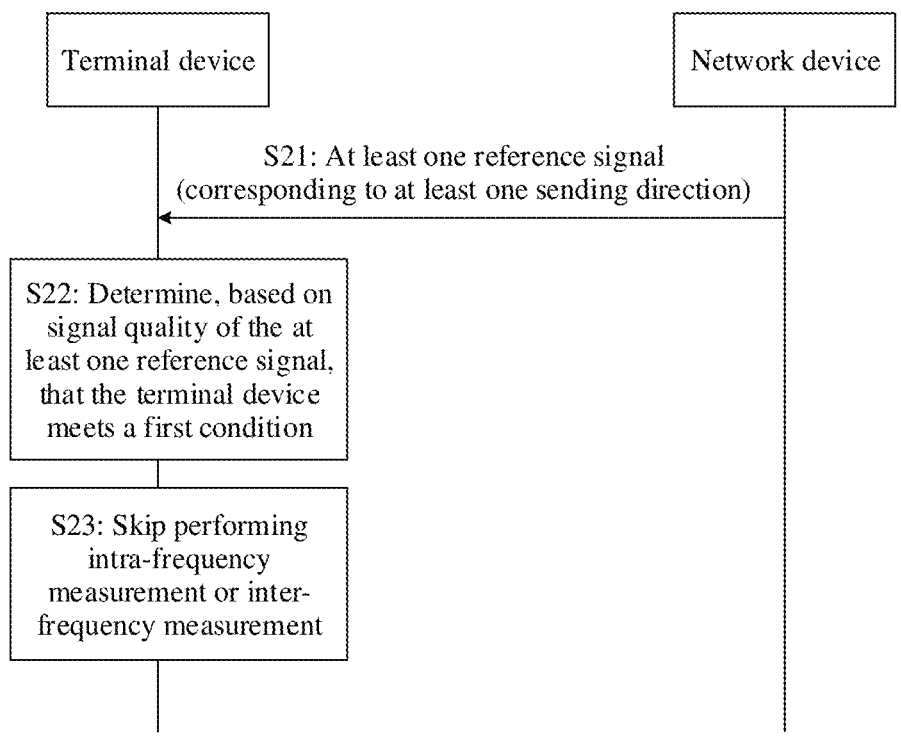
FIG. 2 is a flowchart of a first communications method according to an embodiment of this application.

An embodiment of this application provides a first communications method. FIG. 2 is a flowchart of the method. In the following description process, an example in which the method is applied to the network architecture shown in FIG. 1 is used. In addition, the method may be performed by two communications apparatuses. The two communication apparatuses are, for example, a first communications apparatus and a second communications apparatus. The first communications apparatus may be a network device or a communications apparatus that can support the network device in implementing a function required in the method. Alternatively, the first communications apparatus may be a terminal device or a communications apparatus that can support the terminal device in implementing a function required in the method. Certainly, the first communications apparatus may alternatively be another communications apparatus, for example, a chip system. Similarly, the second communications apparatus may be a network device or a communications apparatus that can support the network device in implementing a function required in the method. Alternatively, the second communications apparatus may be a terminal device or a communications apparatus that can support the terminal device in implementing a function required in the method. Certainly, the second communications apparatus may alternatively be another communications apparatus, for example, a chip system. In addition, implementations of the first communications apparatus and the second communications apparatus are not limited. For example, the first communications apparatus may be a network device, and the second communications apparatus is a terminal device. Alternatively, both the first communications apparatus and the second communications apparatus are network devices. Alternatively, both the first communications apparatus and the second communications apparatus are terminal devices. Alternatively, the first communications apparatus is a network device, and the second communications apparatus is a communications apparatus that can support a terminal device in implementing a function required in the method. The network device is, for example, a base station.

For ease of description, an example in which the method is performed by a terminal device and a network device is used below. In this example, a first communications apparatus is the terminal device and a second communications apparatus is the network device. An example in which this embodiment is applied to the network architecture shown in FIG. 1 is used. Therefore, a network device described below may be the network device in the network architecture shown in FIG. 1, and a terminal device described below may be the terminal device in the network architecture shown in FIG. 1.

S21: The network device sends at least one reference signal to the terminal device, and the terminal device receives, in a serving cell of the terminal device, the at least one reference signal from the network device, where the at least one reference signal corresponds to at least one sending direction.

Figure 3:
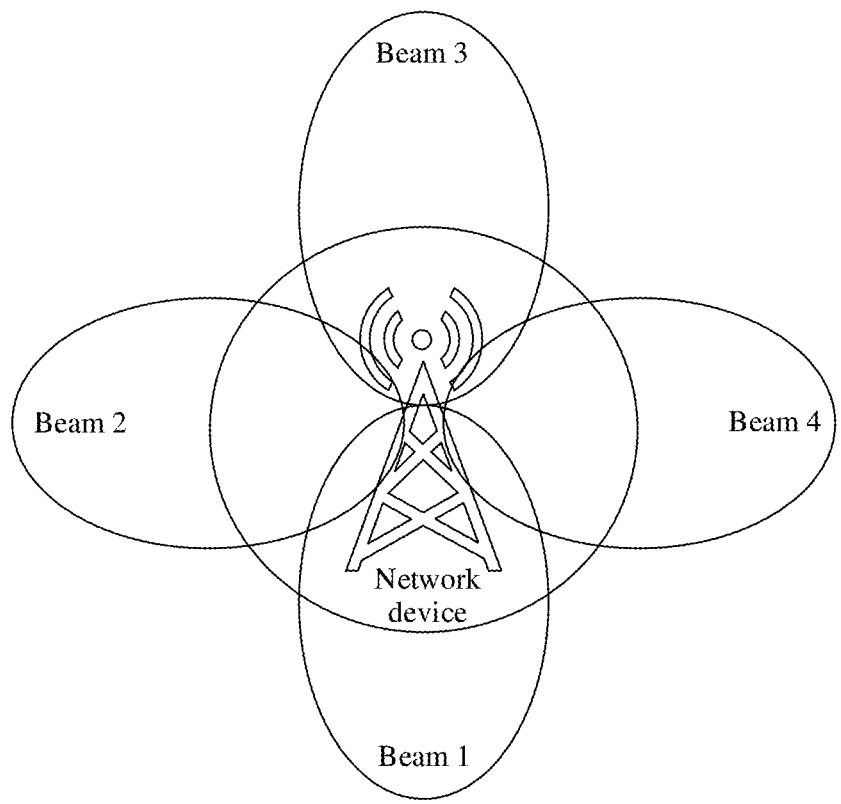
FIG. 3 is a schematic diagram of a beam.

In an NR system, a concept of a beam is introduced. The beam means that the network device emits energy to a range in a direction within a specific time period, to form an energy area similar to the beam, so as to provide a communication service for the terminal device in the direction. To cover terminal devices in all directions, the network device may emit energy to different directions in different time periods in a time division manner, and may cover a direction of 360° in one cycle. For example, refer to FIG. 3. There are four beams: a beam 1, a beam 2, a beam 3, and a beam 4, and a sending cycle of the network device is 40s. In this case, the network device may transmit the beam 1 to a due south direction in the first 10 seconds to cover a 90° range, transmit the beam 2 to a due west direction in the next 10 seconds to cover a 90° range, transmit the beam 3 to a due north direction in the next 10 seconds to cover a 90° range, and transmit the beam 4 to a due east direction in the last 10 seconds to cover a 90° range. Therefore, a 360° range is covered by using the beam 1, the beam 2, the beam 3, and the beam 4 within 40 seconds.

In this embodiment of this application, that the at least one reference signal corresponds to at least one sending direction is, for example, that the at least one reference signal corresponds to at least one beam, or the network device sends the at least one reference signal through at least one beam. It is considered that beams are in a one-to-one correspondence with reference signals. Different beams point to different directions, and the at least one beam sent by the network device may point to the at least one sending direction. The network device sends one reference signal through one beam in one direction. Therefore, it may also be described as that the at least one reference signal corresponds to the at least one sending direction. Identifiers of the reference signals may be in a one-to-one correspondence with identifiers of the beams, or an identifier of the reference signal may also be used as an identifier of the beam. Alternatively, two concepts of a reference signal in a direction and a beam in a direction may be considered as a same concept.

The at least one reference signal may include one or more reference signals. If the at least one reference signal includes one reference signal, the at least one reference signal may also be understood as one reference signal. Alternatively, if the at least one reference signal includes a plurality of reference signals, the at least one reference signal may also be understood as at least two reference signals, for example, the at least one reference signal includes two reference signals, three reference signals, or more reference signals.

S22: The terminal device determines, based on signal quality of the at least one reference signal, that the terminal device meets a first condition, where the at least one reference signal corresponds to the at least one sending direction.

The terminal device may measure the signal quality of the received at least one reference signal, to determine whether the terminal device meets the first condition. Whether the terminal device meets the first condition may include a plurality of implementations. Descriptions are provided below by using examples.

1. Implementation 1 in which the Terminal Device Meets the First Condition

If the terminal device determines that signal quality of a first reference signal of the serving cell meets a first subcondition in first duration, the terminal device may determine that the terminal device meets the first condition. The first duration may be determined by the terminal device, configured by the network device, specified in a protocol, or the like. The first duration may be a value, for example, 5 minutes, or may be set to a discontinuous reception (DRX) cycle length. Alternatively, 5 minutes and a DRX cycle length may be compared, and a larger value in the 5 minutes and the DRX cycle length is selected as a value of the first duration.

For example, the first reference signal is any one of the at least one reference signal. For example, only one of the at least one reference signal needs to be randomly selected, and it may be considered that the terminal device meets the first condition, provided that signal quality of the reference signal meets the first sub-condition in the first duration. Such a manner of determining that the terminal device meets the first condition is simple. The terminal device only needs to randomly select one reference signal to obtain signal quality of the reference signal, and determines whether the signal quality of the reference signal meets the first sub-condition in the first duration. Therefore, a workload of the terminal device is light, and power consumption is low.

The one reference signal in this embodiment of this application may also be understood as "one type of" reference signal. For example, that the network device sends the at least one reference signal may mean that the network device sends at least one type of reference signal. Correspondingly, that the terminal device receives the at least one reference signal may mean that the terminal device receives at least one type of reference signal. The network device may send each type of reference signal once, and the terminal device may receive each type of reference signal once, or the network device may send each type of reference signal for a plurality of times, and the terminal device may receive each type of reference signal for a plurality of times. For example, the network device sends one type of reference signal for a plurality of times, and the terminal device receives one type of reference signal for a plurality of times. In this case, corresponding to different times of receiving of the reference signal, signal quality that is of the reference signal and that is obtained by the terminal device may be different. For example, the first reference signal is one type of reference signal. The network device sends the first reference signal for a plurality of times, and the terminal device also receives the first reference signal for a plurality of times. The terminal device may obtain the signal quality of the first reference signal in the first duration each time receiving the first reference signal. If the signal quality that is of the first reference signal and that is obtained by the terminal device in the first duration meets the first sub-condition, it may be considered that the terminal device meets the first condition.

Alternatively, the first reference signal may be a reference signal with highest signal quality in the at least one reference signal, that is, the signal quality of the first reference signal is higher than or equal to signal quality of a reference signal other than the first reference signal in the at least one reference signal. This may also mean that a beam used to send the first reference signal is an optimal beam in at least one beam. For example, after obtaining the signal quality of the at least one reference signal, the terminal device may select the reference signal with the highest signal quality from the at least one reference signal, or select a reference signal sent through the optimal beam in the at least one beam, and determine whether signal quality of the reference signal meets the first sub-condition in the first duration. If a quantity of the at least one reference signal is greater than 1, and a plurality of reference signals have same signal quality and are all optimal, the terminal device may randomly select one reference signal from the plurality of reference signals, and determine whether signal quality of the reference signal meets the first sub-condition in the first duration. If the signal quality of the reference signal meets the first sub-condition in the first duration, it is considered that the terminal device meets the first condition. A change of an optimal reference signal (that is, a reference signal with highest signal quality, an optimal beam, or a reference signal sent through an optimal beam) is more sensitive to movement of the terminal device, and therefore the optimal reference signal can better represent a movement status of the terminal device. If signal quality of the optimal reference signal meets the first sub-condition in the first duration, it may be considered that the terminal device meets the first condition.

For how to understand that signal quality of one reference signal meets the first sub-condition in the first duration, refer to the foregoing descriptions.

The first sub-condition includes, for example, that a difference between first signal quality of one reference signal and second signal quality of the one reference signal is less than or equal to a first threshold, where the first signal quality is reference signal quality corresponding to the one reference signal, or is a reference value of signal quality used for subsequent comparison with the second signal quality. A change of the signal quality of the reference signal may be determined based on the first signal quality. The second signal quality is current signal quality of the one reference signal. The difference between the first signal quality and the second signal quality may be obtained by subtracting the second signal quality from the first signal quality, or may be obtained by subtracting the first signal quality from the second signal quality. A change of the signal quality of the reference signal may be determined based on the first signal quality and the second signal quality.

The difference between the signal quality herein may be an actual difference. In this case, the difference may be a positive number, 0, or a negative number. For example, for the first reference signal, if the first reference signal is a reference signal sent through the optimal beam in the at least one beam, first signal quality of the first reference signal may be higher than or equal to second signal quality of the first reference signal. If a difference between the first signal quality and the second signal quality is obtained by subtracting the second signal quality from the first signal quality, the difference is a positive number or 0, or if a difference between the first signal quality and the second signal quality is obtained by subtracting the first signal quality from the second signal quality, the difference is a negative number or 0. Alternatively, if the first reference signal is not a reference signal sent through the optimal beam in the at least one beam, but a reference signal sent through a beam other than the optimal beam in the at least one beam, first signal quality of the first reference signal may be lower than or equal to second signal quality of the first reference signal. If a difference between the first signal quality and the second signal quality is obtained by subtracting the second signal quality from the first signal quality, the difference is a negative number or 0, or if a difference between the first signal quality and the second signal quality is obtained by subtracting the first signal quality from the second signal quality, the difference is a positive number or 0.

Alternatively, the difference between the signal quality herein may be an absolute value of an actual difference between the signal quality. For example, the first sub-condition includes that an absolute value of the difference between the first signal quality of the one reference signal and the second signal quality of the one reference signal is less than or equal to the first threshold. Therefore, the difference is a positive number or 0 regardless of whether the difference between the first signal quality and the second signal quality is obtained by subtracting the second signal quality from the first signal quality or obtained by subtracting the first signal quality from the second signal quality, or regardless of a value relationship between the first signal quality and the second signal quality.

In addition, because concepts of the first signal quality and the second signal quality of the one reference signal are introduced, in Implementation 1 in which the first condition is met, actually, the terminal device needs to determine whether actual signal quality (or current signal quality) of the first reference signal meets the first sub-condition, instead of determining whether first signal quality of the first reference signal meets the first sub-condition. Therefore, Implementation 1 in which the first condition is met may also be expressed as follows: If the terminal device determines that the second signal quality of the first reference signal of the serving cell meets the first sub-condition in the first duration, the terminal device may determine that the terminal device meets the first condition. For example, after receiving the at least one reference signal, the terminal device may obtain the second signal quality of the first reference signal. If the terminal device determines that the second signal quality of the first reference signal meets the first sub-condition in the first duration, the terminal device considers that the terminal device meets the first condition. The first reference signal may be any one of the at least one reference signal, or may be a reference signal with highest second signal quality in the at least one reference signal.

In Implementation 1 in which the first condition is met, the first sub-condition may be that the difference between the first signal quality corresponding to the first reference signal and the second signal quality of the first reference signal is less than or equal to the first threshold. The first threshold may be determined by the terminal device, configured by the network device, or specified in a protocol.

For example, the first sub-condition is represented by using Formula 1 or Formula 2:

$$S_{beam/ref} - S_{beam} \leq \text{First threshold} \quad \text{(Formula 1)}$$

$$S_{beam} - S_{beam/ref} \leq \text{First threshold} \quad \text{(Formula 2)}$$

In Formula 1, an example in which the difference between the first signal quality and the second signal quality is obtained by subtracting the second signal quality from the first signal quality is used. In Formula 2, an example in which the difference between the first signal quality and the second signal quality is obtained by subtracting the first signal quality from the second signal quality is used. In addition, an example in which the difference is an actual difference is used in both Formula 1 and Formula 2. Alternatively, the difference may be an absolute value of an actual difference. $S_{beam/ref}$ represents first signal quality corresponding to one reference signal, and $S_{beam}$ represents second signal quality of the reference signal. In Implementation 1 in which the first condition is met, $S_{beam/ref}$ may represent the first signal quality corresponding to the first reference signal, and $S_{beam}$ represents the second signal quality of the first reference signal. The difference between the first signal quality corresponding to the first reference signal and the second signal quality of the first reference signal may represent a change amount of signal quality of the first reference signal. If the change amount of the signal quality of the first reference signal is small, that is, less than or equal to the first threshold, it is considered that the signal quality of the first reference signal meets the first sub-condition (or it is considered that the second signal quality of the first reference signal meets the first sub-condition). Alternatively, if the change amount of the signal quality of the first reference signal is large, for example, greater than the first threshold, it is considered that the signal quality of the first reference signal does not meet the first sub-condition (or it is considered that the second signal quality of the first reference signal does not meet the first sub-condition). If $S_{beam/ref} - S_{beam} = \text{First threshold}$ (or $S_{beam} - S_{beam/ref} = \text{First threshold}$), it may be considered that the signal quality of the first reference signal meets the first sub-condition (or it is considered that the second signal quality of the first reference signal meets the first sub-condition), or it may be considered that the signal quality of the first reference signal does not meet the first sub-condition (or it is considered that the second signal quality of the first reference signal does not meet the first sub-condition).

Each of the at least one reference signal may correspond to one piece of first signal quality. First signal quality corresponding to one reference signal may be used to determine whether second signal quality of the reference signal meets a corresponding condition, for example, determine whether the second signal quality of the reference signal meets the first sub-condition or a second sub-condition. Different reference signals may correspond to same first signal quality or different first signal quality. The at least one reference signal corresponds to at least one piece of first signal quality. The at least one piece of first signal quality may be preset. For one reference signal, first signal quality corresponding to the reference signal may be set in the following manner. After the terminal device completes cell selection or cell reselection, the terminal device sets the first signal quality corresponding to the reference signal to second signal quality of the reference signal. Alternatively, when second signal quality of the reference signal is higher than the first signal quality corresponding to the reference signal, the terminal device sets the first signal quality corresponding to the reference signal to the second signal quality of the reference signal. Alternatively, when duration in which the terminal device does not meet the first condition reaches second duration, the terminal device sets the first signal quality corresponding to the reference signal to second signal quality of the reference signal. In other words, the first signal quality corresponding to the reference signal is initially equal to the second signal quality of the reference signal. If the second signal quality of the reference signal may change, the first signal quality may also be reset accordingly. Setting the first signal quality corresponding to the reference signal to the second signal quality of the reference signal may be understood as setting a value of the first signal quality corresponding to the reference signal to a value of the second signal quality of the reference signal.

Figure 4:
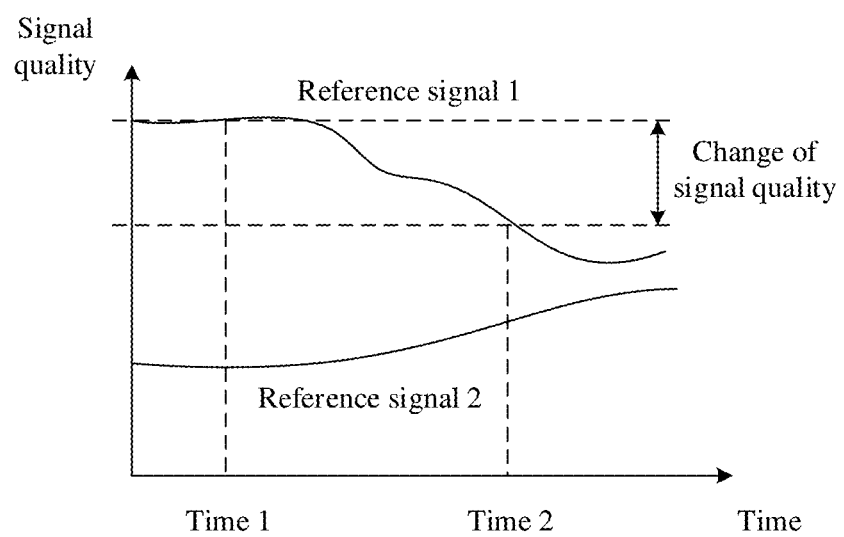
FIG. 4 is a schematic diagram of second signal quality of a reference signal according to an embodiment of this application.

For example, FIG. 4 is a schematic diagram of second signal quality of a reference signal. In FIG. 4, for example, at least one reference signal is three reference signals: a reference signal 1, a reference signal 2, and a reference signal 3, and the reference signal 2 is an optimal reference signal. In FIG. 4, an uppermost curve represents second signal quality of the reference signal 2, a middle curve represents second signal quality of the reference signal 1, and a lowermost curve represents second signal quality of the reference signal 3. For example, a part between two vertical dashed lines in FIG. 4 represents a change amount of the second signal quality of the reference signal. If the first reference signal is the reference signal 2, it may be determined, according to Formula 1 or Formula 2, that the second signal quality of the first reference signal meets the first sub-condition.

In Implementation 1 in which the first condition is met, the terminal device only needs to determine whether second signal quality of one reference signal meets the first sub-condition, but does not need to process excessive reference signals. This is simple.

2. Implementation 2 in which the Terminal Device Meets the First Condition

If the terminal device determines that signal quality of each of M reference signals in the at least one reference signal meets a first sub-condition in first duration, the terminal device determines that the terminal device meets the first condition, where M is an integer greater than or equal to 1, and M is less than or equal to a quantity of the at least one reference signal. It may be considered that the M reference signals are some or all of the at least one reference signal. For example, a value of M is determined by the terminal device, configured by the network device, or specified in a protocol.

After concepts of the first signal quality and the second signal quality are introduced, in Implementation 2 in which the first condition is met, actually, the terminal device needs to determine whether actual signal quality (or current signal quality) of each of the M reference signals meets the first sub-condition, instead of determining whether first signal quality of each of the M reference signals meets the first sub-condition. Therefore, Implementation 2 in which the first condition is met may also be expressed as follows: If the terminal device determines that the second signal quality of each of the M reference signals in the at least one reference signal meets the first sub-condition in the first duration, the terminal device determines that the terminal device meets the first condition. For example, after receiving the at least one reference signal, the terminal device may obtain the second signal quality of each of the M reference signals. If the terminal device determines that the second signal quality of each of the M reference signals meets the first sub-condition in the first duration, the terminal device considers that the terminal device meets the first condition. For a manner of setting the first signal quality of the reference signal, refer to the foregoing descriptions.

The M reference signals are, for example, M reference signals randomly selected from the at least one reference signal. Such a manner of determining that the terminal device meets the first condition is simple. The terminal device only needs to randomly select the M reference signals to obtain second signal quality of each of the M reference signals, and determines whether signal quality of each reference signal meets the first sub-condition (or determines whether the second signal quality of each reference signal meets the first sub-condition). Therefore, a workload of the terminal device is light, and power consumption is low.

Alternatively, the M reference signals are, for example, reference signals with higher second signal quality in the at least one reference signal. For example, second signal quality of each of the M reference signals is higher than or equal to second signal quality of a reference signal other than the M reference signals in the at least one reference signal. For example, after obtaining the second signal quality of the at least one reference signal, the terminal device may select M reference signals with highest second signal quality from the at least one reference signal, and then determine whether signal quality of each of the M reference signals meets the first sub-condition (or determine whether the second signal quality of each of the M reference signals meets the first sub-condition).

Alternatively, M is greater than or equal to 2, the M reference signals are, for example, M reference signals selected from the at least one reference signal, and the M reference signals include a second reference signal. Second signal quality of the second reference signal is higher than or equal to second signal quality of another reference signal in the at least one reference signal, or the second reference signal is sent through an optimal beam in at least one beam. For example, the M reference signals include a reference signal sent through the optimal beam in the at least one beam, and further include a reference signal sent through another beam different from the optimal beam in the at least one beam. In this manner, both the reference signal sent through the optimal beam and the reference signal sent through the another beam are considered, so that a determining result can be more accurate.

The first sub-condition may continue to be represented by using Formula 1 or Formula 2. Whether the second signal quality of each of the M reference signals meets the first sub-condition may be determined by using Formula 1 or Formula 2. Similarly, in Implementation 2 in which the first condition is met, the difference between the first signal quality and the second signal quality may be an actual difference, or may be an absolute value of an actual difference. In Implementation 2 in which the first condition is met, in Formula 1 or Formula 2, $S_{beam/ref}$ may represent first signal quality corresponding to one of the M reference signals, and $S_{beam}$ represents second signal quality of the reference signal. A difference between the first signal quality corresponding to the reference signal and the second signal quality of the reference signal may represent a change amount of the second signal quality of the reference signal. If the change amount of the second signal quality of each of the M reference signals is small, that is, less than or equal to the first threshold, it is considered that signal quality of each of the M reference signals meets the first sub-condition (or it is determined that the second signal quality of each of the M reference signals meets the first sub-condition). Therefore, it is considered that the terminal device meets the first condition. Alternatively, if a change amount of each piece of second signal quality of one or more of the M reference signals is large, for example, the change amount of each piece of the second signal quality of the reference signals is greater than the first threshold, it is considered that the second signal quality of the reference signals does not meet the first sub-condition (or it is considered that the second signal quality of the reference signals does not meet the first sub-condition). Therefore, it is considered that that the terminal device does not meet the first condition. For one reference signal, if $S_{beam/ref}-S_{beam}$=First threshold (or $S_{beam}-S_{beam/ref}$=First threshold), it may be considered the signal quality of the reference signal meets the first sub-condition (or it is considered that the second signal quality of the reference signal meets the first sub-condition), or it may be considered that the signal quality of the reference signal does not meet the first sub-condition (or it is considered that the second signal quality of the reference signal does not meet the first sub-condition).

For how to understand that signal quality (or second signal quality) of one of the M reference signals meets the first sub-condition in the first duration, refer to the foregoing descriptions.

It should be noted that a value of the first threshold used in Implementation 2 in which the first condition is met may be the same as or different from a value of the first threshold used in Implementation 1 in which the first condition is met.

In Implementation 2 in which the first condition is met, the terminal device may consider second signal quality of a plurality of reference signals, and determine whether the second signal quality of the plurality of reference signals meets the first sub-condition, to improve accuracy of a determining result.

3. Implementation 3 in which the Terminal Device Meets the First Condition

The terminal device obtains first information based on the signal quality of the at least one reference signal, and if the terminal device determines that the first information meets a second sub-condition in first duration, the terminal device determines that the terminal device meets the first condition.

Obtaining the first information based on the signal quality of the at least one reference signal may be obtaining the first information based on at least one piece of second signal quality and at least one piece of first signal quality of the at least one reference signal. For a manner of setting the first signal quality of the reference signal, refer to the foregoing descriptions. For example, in a manner of obtaining the first information, the first information may satisfy Formula 3 or Formula 4:

$$S=\Sigma_{i=1}^{N}(S_{ref,i}-S_i)^2 \quad \text{(Formula 3)}$$

$$S=\Sigma_{i=1}^{N}|(S_{ref,i}-S_i)| \quad \text{(Formula 4)}$$

In Formula 3 and Formula 4, S represents the first information, i represents a sequence number of an $i^{th}$ reference signal in the at least one reference signal, N represents the quantity of the at least one reference signal, $S_i$ represents second signal quality of the $i^{th}$ reference signal, $S_{ref,i}$ represents first signal quality of the $i^{th}$ reference signal, and $|(S_{ref,i}-S_i)|$ represents an absolute value of $(S_{ref,i}-S_i)$.

The second sub-condition includes, for example, that S is less than or equal to a second threshold. If S is equal to the second threshold, it may be considered that the second sub-condition is met, or it may be considered that the second sub-condition is not met. Alternatively, the second sub-condition includes, for example, that S/N is less than or equal to a second threshold. If S/N is equal to the second threshold, it may be considered that the second sub-condition is met, or it may be considered that the second sub-condition is not met. The second threshold may be determined by the terminal device, configured by the network device, or specified in a protocol.

The one reference signal in this embodiment of this application may also be understood as "one type of" reference signal. For example, that the network device sends the at least one reference signal may mean that the network device sends at least one type of reference signal. Correspondingly, that the terminal device receives the at least one reference signal may mean that the terminal device receives at least one type of reference signal. The network device may send each type of reference signal once, and the terminal device may receive each type of reference signal once, or the network device may send each type of reference signal for a plurality of times, and the terminal device may receive each type of reference signal for a plurality of times. For example, the network device sends one type of reference signal for a plurality of times, and the terminal device receives one type of reference signal for a plurality of times. In this case, corresponding to different times of receiving of the reference signal, signal quality that is of the reference signal and that is obtained by the terminal device may be different. For example, the network device sends the at least one reference signal for a plurality of times, and the terminal device also receives the at least one reference signal for a plurality of times. For example, the network device may send the at least one reference signal each time and may send the at least one reference signal for a plurality of times, and the terminal device may receive the at least one reference signal each time and may receive the at least one reference signal for a plurality of times. The terminal device may obtain the first information in the first duration each time receiving the at least one reference signal. If the first information obtained by the terminal device in the first duration meets the second sub-condition, it may be considered that the terminal device meets the first condition.

It should be noted that a value of the first threshold used in Implementation 2 in which the first condition is met may be the same as or different from a value of the second threshold herein. If the value of the first threshold used in Implementation 2 in which the first condition is met is different from a value of the first threshold used in Implementation 1 in which the first condition is met, the value of the first threshold used in Implementation 2 in which the first condition is met may be the same as or different from the value of the second threshold herein.

In Implementation 3 in which the first condition is met, the terminal device may obtain the first information based on the at least one piece of signal quality of the at least one reference signal, and determine whether the first information meets the second sub-condition, that is, comprehensively determine whether the signal quality of the at least one reference signal meets the second sub-condition, to improve accuracy of a determining result.

4. Implementation 4 in which the Terminal Device Meets the First Condition

If the terminal device determines that signal quality of a reference signal of the serving cell meets a first sub-condition in first duration, the terminal device may determine that the terminal device meets the first condition. In Implementation 4 in which the first condition is met, a direction of a reference signal sent by the network device may not be considered. For example, because the network device does not send the reference signal through a beam, the direction of the reference signal received by the terminal device is not considered.

Similarly, the reference signal in this embodiment of this application may also be understood as "one type of" reference signal. For example, that the network device sends the reference signal may mean that the network device sends one type of reference signal. Correspondingly, that the terminal device receives the reference signal may mean that the terminal device receives one type of reference signal. The network device may send the reference signal once, and the terminal device may receive the reference signal once, or the network device may send the reference signal for a plurality of times, and the terminal device may receive the reference signal for a plurality of times. For example, the network device sends one type of reference signal for a plurality of times, and the terminal device receives one type of reference signal for a plurality of times. In this case, corresponding to different times of receiving of the reference signal, signal quality that is of the reference signal and that is obtained by the terminal device may be different. The terminal device may obtain the signal quality of the reference signal in the first duration each time receiving the reference signal of the serving cell. If the signal quality that is of the reference signal and that is obtained by the terminal device in the first duration meets the first sub-condition, it may be considered that the terminal device meets the first condition.

After concepts of the first signal quality and the second signal quality are introduced, in Implementation 4 in which the first condition is met, actually, the terminal device needs to determine whether actual signal quality (or current signal quality) of the reference signal of the serving cell meets the first sub-condition, instead of determining whether first signal quality of the reference signal of the serving cell meets the first sub-condition. Therefore, Implementation 4 in which the first condition is met may also be expressed as follows: If the terminal device determines that the second signal quality of the reference signal of the serving cell meets the first sub-condition in the first duration, the terminal device determines that the terminal device meets the first condition. For example, after receiving the reference signal of the serving cell, the terminal device may obtain the second signal quality of the reference signal. If the terminal device determines that the second signal quality of the reference signal meets the first sub-condition in the first duration, the terminal device considers that the terminal device meets the first condition. For a manner of setting the first signal quality of the reference signal, refer to the foregoing descriptions.

The first sub-condition may continue to be represented by using Formula 1 or Formula 2. Whether the second signal quality of the reference signal of the serving cell meets the first sub-condition may be determined by using Formula 1 or Formula 2. Similarly, in Implementation 4 in which the first condition is met, the difference between the first signal quality and the second signal quality may be an actual difference, or may be an absolute value of an actual difference. In Implementation 4 in which the first condition is met, in Formula 1 or Formula 2, $S_{beam/ref}$ may represent first signal quality corresponding to the reference signal, and $S_{beam}$ represents second signal quality of the reference signal. A difference between the first signal quality corresponding to the reference signal and the second signal quality of the reference signal may represent a change amount of the second signal quality of the reference signal. If the change amount of the second signal quality of the reference signal is small, that is, less than or equal to the first threshold, it is considered that signal quality of the reference signal meets the first sub-condition (or it is determined that the second signal quality of the reference signal meets the first sub-condition). Therefore, it is considered that the terminal device meets the first condition. Alternatively, if the change amount of the second signal quality of the reference signal is large, for example, the change amount of the second signal quality of the reference signal is greater than the first threshold, it is considered that the second signal quality of the reference signal does not meet the first sub-condition (or it is considered that the second signal quality of the reference signal does not meet the first sub-condition). Therefore, it is considered that the terminal device does not meet the first condition. For the reference signal, if $S_{beam/ref}-S_{beam}$=First threshold (or $S_{beam}-S_{beam/ref}$=First threshold), it may be considered that the signal quality of the reference signal meets the first sub-condition (or it is considered that the second signal quality of the reference signal meets the first sub-condition), or it may be considered that the signal quality of the reference signal does not meet the first sub-condition (or it is considered that the second signal quality of the reference signal does not meet the first sub-condition).

It should be noted that a value of the first threshold used in Implementation 2 in which the first condition is met, a value of the first threshold used in Implementation 1 in which the first condition is met, and a value of the first threshold used in Implementation 4 in which the first condition is met may be the same or different, or values of any two of the three first thresholds may be different from a value of the other first threshold.

Certainly, determining that the terminal device meets the first condition is not limited to the foregoing four implementations. This is not specifically limited.

In addition, the terminal device may further determine a location of the terminal device in a cell based on the signal quality (for example, second signal quality) of the at least one reference signal. The cell herein is the serving cell of the terminal device. For example, based on the signal quality of the at least one reference signal, the terminal device may determine that the terminal device is located at an edge location of the cell, or determine that the terminal device meets a criterion for performing neighboring cell measurement. The criterion for performing neighboring cell measurement that is met may be a criterion S. The criterion S means that power of a current serving cell of the terminal device is less than or equal to a power threshold for enabling neighboring cell measurement, signal quality of a current serving cell of the terminal device is less than or equal to a signal quality threshold for enabling neighboring cell measurement, or power of a current serving cell of the terminal device is less than or equal to a power threshold for enabling neighboring cell measurement, and signal quality of a current serving cell of the terminal device is less than or equal to a signal quality threshold for enabling neighboring cell measurement. A sending direction of the at least one reference signal is clear. The network device may send sending direction information (or a correspondence between a beam and a location of a cell) of the at least one reference signal to the terminal device, and may further send an identifier of the at least one reference signal to the terminal device, so that the terminal device can learn of a correspondence between each beam and a corresponding location in the cell. Further, if second signal quality that is of a reference signal and that is obtained by the terminal device through measurement is higher, the terminal device may determine that the terminal device is in or near a sending direction of the reference signal. Further, the terminal device may determine whether the terminal device is located at a center location of the cell or an edge location of the cell. For example, the at least one reference signal includes a reference signal 1 sent through a beam 1, and a sending direction of the beam 1 points to a center of the cell. If second signal quality that is of the reference signal 1 and that is obtained by the terminal device through measurement is highest, the terminal device may determine that the terminal device is located at or near the center location of the cell.

Measurement rules may be different based on different locations of the terminal device in the cell. For example, if the terminal device is located at the center location of the cell, the terminal device may use a first measurement rule, and if the terminal device is located at the edge location of the cell, the terminal device may use a second measurement rule. For example, the first measurement rule may include: skipping performing intra-frequency measurement or inter-frequency measurement. Alternatively, the first measurement rule may include one or any combination of the following: reducing to-be-measured bandwidth, reducing a quantity of to-be-measured cells, reducing a quantity of to-be-measured bandwidth parts (BWPs), or reducing a quantity of to-be-measured frequencies. For example, the first measurement rule may include: reducing the to-be-measured bandwidth. Alternatively, the first measurement rule may include: reducing the quantity of to-be-measured cells and reducing the quantity of to-be-measured frequencies. Alternatively, the first measurement rule may include: reducing the to-be-measured bandwidth, reducing the quantity of to-be-measured cells, and reducing the quantity of to-be-measured frequencies. A second measurement rule may be a normal measurement rule, that is, when a criterion S for neighboring cell measurement is met, the terminal device normally performs periodic or event-triggered intra-frequency measurement or inter-frequency measurement.

The first measurement rule may also be referred to as a relaxed measurement rule, and the first measurement rule and the relaxed measurement rule may be replaced with each other.

In an optional implementation, before determining that the terminal device meets the first condition, that is, before S22, the terminal device may first determine whether a condition for performing neighboring cell intra-frequency or inter-frequency measurement is met. If the condition for performing neighboring cell measurement is met, the terminal device may continue to determine whether the terminal device meets the first condition, that is, perform S22. If the condition for performing neighboring cell measurement is not met, the terminal device may no longer need to perform S22 and S23 or directly perform the first measurement rule. Therefore, the procedure may end.

In another optional implementation, the network device may also send indication information to the terminal device, where the indication information is used to indicate whether the terminal device can perform determining or an operation on whether the relaxed measurement rule is met. Assuming that the indication information indicates the terminal device not to perform the relaxed measurement rule, the terminal device does not perform S22 in a period of time, and therefore does not perform the first measurement rule.

In another optional implementation, before determining that the terminal device meets the first condition, that is, before S22, the terminal device may first determine a location of the terminal device in the cell based on the signal quality of the at least one reference signal. If the terminal device determines that the terminal device is located at the edge location of the cell, the terminal device may continue to determine whether the terminal device meets the first condition, that is, perform S22. If the terminal device determines that the terminal device is located at the center location of the cell, the terminal device may no longer need to perform S22 and S23 or directly perform the first measurement rule. Therefore, the procedure may end.

Alternatively, if the terminal device determines that the terminal device is located at the center location of the cell, the terminal device may continue to perform steps to be described in a next embodiment. The steps are described in the next embodiment.

Alternatively, if the terminal device determines that the terminal device is located at the center location of the cell, the terminal device may continue to perform S22. However, in this case, a threshold (for example, a first threshold, a second threshold, or a first threshold and a second threshold) used by the terminal device located at the edge location of the call when the terminal device determines whether the terminal device meets the first condition may be the same as or different from a threshold used by the terminal device located at the center location of the cell when the terminal device determines whether the terminal device meets the first condition. For example, the terminal device at the edge of the cell uses a first threshold when determining whether the terminal device meets the first threshold, and the terminal device at the center of the cell also uses a first threshold when determining whether the terminal device meets the first condition. Values of the two first thresholds may be the same or different. If the values of the two first thresholds are different, the value of the first threshold used by the terminal device at the center of the cell may be greater than the value of the first threshold used by the terminal device at the edge of the cell. For another example, the terminal device at the edge of the cell uses a second threshold when determining whether the terminal device meets the first threshold, and the terminal device at the center of the cell also uses a second threshold when determining whether the terminal device meets the first condition. Values of the two second thresholds may be the same or different. If the values of the two second thresholds are different, the value of the second threshold used by the terminal device at the center of the cell may be greater than the value of the second threshold used by the terminal device at the edge of the cell.

For the terminal device at the center of the cell, a probability that the serving cell changes is low, and a probability of performing cell handover or reselection is low. Even if neighboring cell measurement is not performed, normal work may not be affected. In other words, the terminal device at the center of the cell may not need to perform neighboring cell measurement. Therefore, a value of a threshold used by the terminal device at the center of the cell may be large, so that the terminal device can more easily meet the first condition, and therefore have a higher probability of performing the relaxed measurement rule. In an extreme case, the terminal device may be configured to always perform relaxed measurement. If the terminal device at the edge of the cell is in a moving state, a probability that the serving cell changes is high, and a probability of performing cell handover or reselection is high. In this case, neighboring cell measurement needs to be performed to assist in selecting a new cell. Therefore, a value of a threshold used by the terminal device at the edge of the cell may be small, so that the terminal device cannot easily meet the first condition, and therefore can perform neighboring cell measurement more frequently or for a longer time.

Thresholds (for example, a first threshold, a second threshold, or a first threshold and a second threshold) used by the terminal devices at the different locations may be determined by the terminal device, configured by the network device, or specified in a protocol.

It should be noted herein that a location that is of the terminal device and that is determined by using a reference signal is not limited to only two levels: the center location of the cell and the edge location of the cell. In this embodiment, the two locations are used merely for description. Because reference signals have many directions, a more precise cell location may be determined by using the reference signal for division, to set more precise and different measurement criteria for the terminal devices at the different locations.

The reference signal in this embodiment of this application includes but is not limited to one or any combination of the following: a synchronization information block (SSB), a channel state information reference signal (CSI-RS), a physical broadcast channel block (PBCH Block), or a cell reference signal (CRS). For example, in this embodiment of this application, the reference signal includes the SSB, the reference signal includes the CSI-RS, the reference signal includes the SSB and the PBCH block, the reference signal includes the CSI-RS, the CRS, and the SSB, or the reference signal includes the SSB, the CSI-RS, the PBCH block, and the CRS.

S23: The terminal device performs measurement according to the first measurement rule.

For the first measurement rule, refer to related descriptions of S22.

If the terminal device determines that the terminal device meets the first condition, the terminal device may consider that the terminal device meets the first measurement rule. In this case, the terminal device may use the first measurement rule. For example, the terminal device may not perform intra-frequency measurement or inter-frequency measurement, or the terminal device may reduce a quantity of to-be-measured frequencies. Relaxed measurement is relative to common measurement (measurement performed when relaxed measurement is not performed, which may also be referred to as the second measurement rule). When performing common measurement, the terminal device performs periodic or event-triggered measurement on a signal.

When meeting the relaxed measurement rule, the terminal device may perform measurement according to the first measurement rule. For example, the terminal device may choose not to perform intra-frequency measurement or inter-frequency measurement in a period of time. A case in which the terminal device meets the relaxed measurement rule is described in detail below.

However, it should be noted that the terminal device may continuously or periodically determine whether the terminal device meets the first condition, and determine, each time determining whether the terminal device meets the first condition, whether to perform measurement according to the first measurement rule. Therefore, that the terminal device performs measurement according to the first measurement rule only indicates that when determining that the first condition is met, the terminal device performs measurement according to the first measurement rule within a period of time (between a time point of determining, this time, whether the first condition is met and a time point of determining, next time, whether the first condition is met). For example, the terminal device performs measurement according to the first measurement rule in fourth duration. After the fourth duration ends, the terminal device may still perform measurement according to another measurement rule. For example, the terminal device may continue to normally perform intra-frequency measurement or inter-frequency measurement. A start moment of the fourth duration is, for example, a moment at which the terminal device determines that the terminal device meets the first condition, and an end moment of the fourth duration is, for example, a moment at which the terminal device determines, next time, that the terminal device does not meet the first condition, or an end moment of the fourth duration is, for example, a moment at which the terminal device determines that the terminal device meets a second condition. The second condition is described in a next embodiment.

In this embodiment of this application, the terminal device needs to determine to perform measurement according to the first measurement rule on the premise that any one of the following conditions or any combination of the following plurality of conditions needs to be met: The terminal device meets the first condition, the duration since cell reselection is last performed is less than or equal to a third duration, or the duration in which the terminal device performs intra-frequency measurement or inter-frequency measurement since cell selection or cell reselection is last performed is greater than or equal to the first duration. For example, the terminal device may perform measurement according to the first measurement rule provided that the terminal device meets the first condition. In this case, the terminal device may perform S23 after performing S22. Alternatively, the terminal device may perform measurement according to the first measurement rule if the terminal device meets the first condition, and the duration since cell reselection is last performed is less than or equal to the third duration. In this case, before S23, in addition to performing S22, the terminal device further needs to determine that the duration since cell reselection is last performed is less than or equal to the third duration. Alternatively, the terminal device may perform measurement according to the first measurement rule if the terminal device meets the first condition, the duration since cell reselection is last performed is less than or equal to the third duration, and the duration in which the terminal device performs intra-frequency measurement or inter-frequency measurement since cell selection or cell reselection is last performed is greater than or equal to the first duration. In this case, before S23, in addition to performing S22, the terminal device further needs to determine that the duration since cell reselection is last performed is less than or equal to the third duration, and needs to determine that the duration in which the terminal device performs intra-frequency measurement or inter-frequency measurement since cell selection or cell reselection is last performed is greater than or equal to the first duration.

In addition, if the terminal device determines that the terminal device meets the first condition, the terminal device may also consider that the terminal device is in a static state. In this case, it may be considered that the terminal device meets the relaxed measurement rule, and further there may be another purpose, for example, the terminal device may further determine that a timing advance (TA) does not change. Therefore, the network device may continue to schedule the terminal device by using an original TA, or the terminal device may continue to communicate with the network device by using an original TA, to ensure a normal communication process, and reduce a scheduling failure probability.

In this embodiment of this application, it may be determined, based on the signal quality of the at least one reference signal of the serving cell of the terminal device, that the terminal device may not perform intra-frequency measurement or inter-frequency measurement, that is, a movement status of the terminal device may be determined based on the signal quality of the at least one reference signal. For example, it may be determined that the terminal device is in a static state or is not in a moving state. Therefore, the terminal device may not perform intra-frequency measurement or inter-frequency measurement. The at least one reference signal corresponds to the at least one sending direction, that is, direction information may be added when the movement status of the terminal device is determined, so that accuracy of a determining result can be improved, and impact on a communication process of the terminal device can be reduced.

In the embodiment shown in FIG. 2, how the terminal device determines to use the first measurement rule is described, or how the terminal device determines that the relaxed measurement rule is met is described. However, because the terminal device may determine a case in which the relaxed measurement rule is met, the terminal device may determine a case in which the relaxed measurement rule is not met. Therefore, an embodiment of this application provides a second communications method. In the method, how the terminal device determines that the relaxed measurement rule is not met is described.

Figure 5:
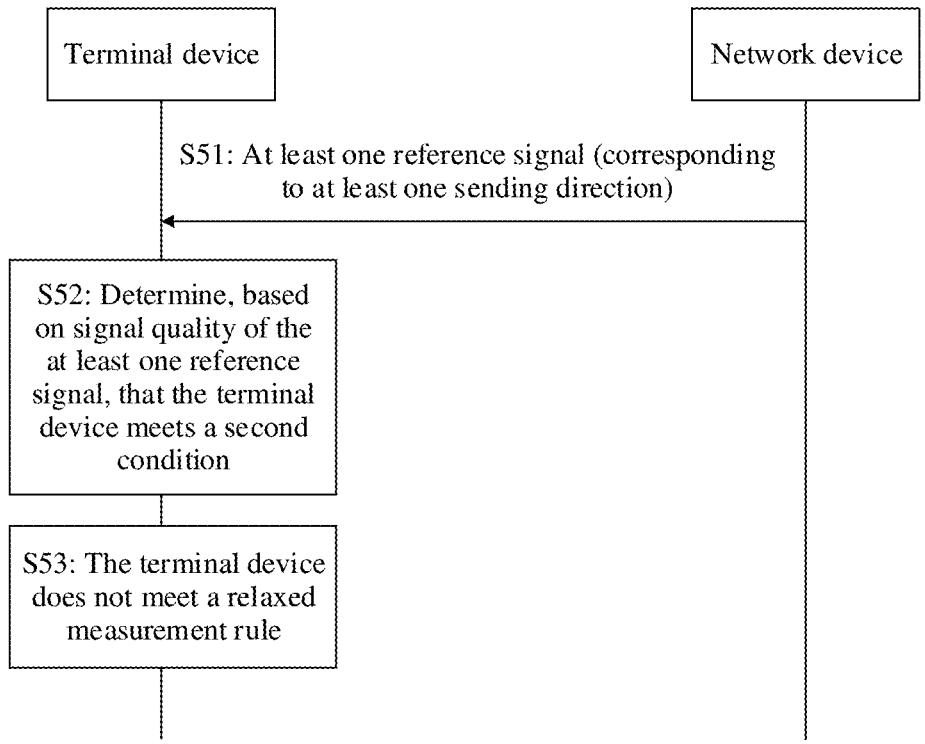
FIG. 5 is a flowchart of a second communications method according to an embodiment of this application.

FIG. 5 is a flowchart of a second communications method. In the following description process, an example in which the method is applied to the network architecture shown in FIG. 1 is still used. In addition, the method may be performed by two communications apparatuses. The two communications apparatuses are, for example, a first communications apparatus and a second communications apparatus. The first communications apparatus may be a network device or a communications apparatus that can support the network device in implementing a function required in the method. Alternatively, the first communications apparatus may be a terminal device or a communications apparatus that can support the terminal device in implementing a function required in the method. Certainly, the first communications apparatus may alternatively be another communications apparatus, for example, a chip system. Similarly, the second communications apparatus may be a network device or a communications apparatus that can support the network device in implementing a function required in the method. Alternatively, the second communications apparatus may be a terminal device or a communications apparatus that can support the terminal device in implementing a function required in the method. Certainly, the second communications apparatus may alternatively be another communications apparatus, for example, a chip system. In addition, implementations of the first communications apparatus and the second communications apparatus are not limited. For example, the first communications apparatus may be a network device, and the second communications apparatus is a terminal device. Alternatively, both the first communications apparatus and the second communications apparatus are network devices. Alternatively, both the first communications apparatus and the second communications apparatus are terminal devices. Alternatively, the first communications apparatus is a network device, and the second communications apparatus is a communications apparatus that can support a terminal device in implementing a function required in the method. The network device is, for example, a base station.

For ease of description, an example in which the method is performed by a terminal device and a network device is used below. In this example, a first communications apparatus is the terminal device and a second communications apparatus is the network device. An example in which this embodiment is applied to the network architecture shown in FIG. 1 is used. Therefore, a network device described below may be the network device in the network architecture shown in FIG. 1, and a terminal device described below may be the terminal device in the network architecture shown in FIG. 1.

S51: The network device sends at least one reference signal to the terminal device, and the terminal device receives, in a serving cell of the terminal device, the at least one reference signal from the network device, where the at least one reference signal corresponds to at least one sending direction.

In this embodiment of this application, that the at least one reference signal corresponds to at least one sending direction is, for example, that the at least one reference signal corresponds to at least one beam, or the network device sends the at least one reference signal through at least one beam. It is considered that beams are in a one-to-one correspondence with reference signals. Different beams point to different directions, and the at least one beam sent by the network device may point to the at least one sending direction. The network device sends one reference signal through one beam in one direction. Therefore, it may also be described as that the at least one reference signal corresponds to the at least one sending direction. For more descriptions of the beam, refer to S21 in the embodiment shown in FIG. 2.

Identifiers of the reference signals may be in a one-to-one correspondence with identifiers of the beams, or an identifier of the reference signal may also be used as an identifier of the beam. Alternatively, two concepts of a reference signal in a direction and a beam in a direction may be considered as a same concept.

The at least one reference signal may include one or more reference signals. If the at least one reference signal includes one reference signal, the at least one reference signal may also be understood as one reference signal. Alternatively, if the at least one reference signal includes a plurality of reference signals, the at least one reference signal may also be understood as at least two reference signals, for example, the at least one reference signal includes two reference signals, three reference signals, or more reference signals.

S52: The terminal device determines, based on signal quality of the at least one reference signal of the terminal device, that the terminal device meets a second condition, where the at least one reference signal corresponds to the at least one sending direction.

The terminal device may measure the signal quality of the received at least one reference signal, to determine whether the terminal device meets the second condition. Whether the terminal device meets the second condition may include a plurality of implementations. Descriptions are provided below by using examples.

1. Implementation 1 in which the Terminal Device Meets the Second Condition.

If the terminal device determines that signal quality of a first reference signal of the serving cell meets a third sub-condition, the terminal device may determine that the terminal device meets the second condition.

For example, the first reference signal is any one of the at least one reference signal. For example, only one of the at least one reference signal needs to be randomly selected, and it may be considered that the terminal device meets the second condition, provided that signal quality of the reference signal meets the third sub-condition. Such a manner of determining that the terminal device meets the second condition is simple. The terminal device only needs to randomly select one reference signal to obtain signal quality of the reference signal, and determines whether the signal quality of the reference signal meets the third sub-condition. Therefore, a workload of the terminal device is light, and power consumption is low.

Alternatively, the first reference signal may be a reference signal with highest signal quality in the at least one reference signal, that is, the signal quality of the first reference signal is higher than or equal to signal quality of a reference signal other than the first reference signal in the at least one reference signal. This may also mean that a beam used to send the first reference signal is an optimal beam in at least one beam. For example, after obtaining the signal quality of the at least one reference signal, the terminal device may select the reference signal with the highest signal quality from the at least one reference signal, or select a reference signal sent through the optimal beam in the at least one beam, and determine whether signal quality of the reference signal meets the third sub-condition. If a quantity of the at least one reference signal is greater than 1, and a plurality of reference signals have same signal quality and are all optimal, the terminal device may randomly select one reference signal from the plurality of reference signals, and determine whether signal quality of the reference signal meets the third sub-condition. If the signal quality of the reference signal meets the third sub-condition, it is considered that the terminal device meets the second condition. An optimal reference signal (that is, a reference signal with highest signal quality or a reference signal sent through an optimal beam) can represent a status of the terminal device.

If signal quality of the optimal reference signal meets the third sub-condition, it may be considered that the terminal device meets the second condition.

The third sub-condition includes, for example, that a difference between first signal quality of one reference signal and second signal quality of the one reference signal is greater than or equal to a first threshold, where the first signal quality is reference signal quality corresponding to the one reference signal, or is a reference value of signal quality used for subsequent comparison with the second signal quality. The second signal quality is current signal quality of the one reference signal. The difference between the first signal quality and the second signal quality may be obtained by subtracting the second signal quality from the first signal quality, or may be obtained by subtracting the first signal quality from the second signal quality. A change of the signal quality of the reference signal may be determined based on the first signal quality and the second signal quality.

The difference between the signal quality herein may be an actual difference, or may be an absolute value of an actual difference. For the content, refer to related descriptions of the embodiment shown in FIG. 2.

In addition, because concepts of the first signal quality and the second signal quality of the one reference signal are introduced, in Implementation 1 in which the second condition is met, actually, the terminal device needs to determine whether actual signal quality (or current signal quality) of the first reference signal meets the third sub-condition, instead of determining whether first signal quality of the first reference signal meets the third sub-condition. Therefore, Implementation 1 in which the second condition is met may also be expressed as follows: If the terminal device determines that the second signal quality of the first reference signal of the serving cell meets the third sub-condition, the terminal device may determine that the terminal device meets the second condition. For example, after receiving the at least one reference signal, the terminal device may obtain the second signal quality of the first reference signal. If the terminal device determines that the second signal quality of the first reference signal meets the third sub-condition, the terminal device considers that the terminal device meets the second condition. The first reference signal may be any one of the at least one reference signal, or may be a reference signal with highest second signal quality in the at least one reference signal.

In Implementation 1 in which the second condition is met, the third sub-condition may be that the difference between the first signal quality corresponding to the first reference signal and the second signal quality of the first reference signal is greater than or equal to the first threshold. The first threshold may be determined by the terminal device, configured by the network device, or specified in a protocol.

For example, the third sub-condition is represented by using Formula 5 or Formula 6:

$$S_{beam/ref} - S_{beam} \geq \text{First threshold} \quad \text{(Formula 5)}$$

$$S_{beam} - S_{beam/ref} \geq \text{First threshold} \quad \text{(Formula 6)}$$

In Formula 5, an example in which the difference between the first signal quality and the second signal quality is obtained by subtracting the second signal quality from the first signal quality is used. In Formula 6, an example in which the difference between the first signal quality and the second signal quality is obtained by subtracting the first signal quality from the second signal quality is used. In addition, an example in which the difference is an actual difference is used in both Formula 5 and Formula 6. Alternatively, the difference may be an absolute value of an actual difference. $S_{beam/ref}$ represents first signal quality corresponding to one reference signal, and $S_{beam}$ represents second signal quality of the reference signal. In Implementation 1 in which the second condition is met, $S_{beam/ref}$ may represent the first signal quality corresponding to the first reference signal, and $S_{beam}$ represents the second signal quality of the first reference signal. The difference between the first signal quality corresponding to the first reference signal and the second signal quality of the first reference signal may represent a change amount of signal quality of the first reference signal. If the change amount of the signal quality of the first reference signal is large, that is, greater than or equal to the first threshold, it is considered that the signal quality of the first reference signal meets the third sub-condition (or it is considered that the second signal quality of the first reference signal meets the third sub-condition). Alternatively, if the change amount of the signal quality of the first reference signal is small, for example, less than the first threshold, it is considered that the signal quality of the first reference signal does not meet the third sub-condition (or it is considered that the second signal quality of the first reference signal does not meet the third sub-condition). If $S_{beam/ref} - S_{beam} =$ First threshold (or $S_{beam} - S_{beam/ref} =$ First threshold), it may be considered that the signal quality of the first reference signal meets the third sub-condition (or it is considered that the second signal quality of the first reference signal meets the third sub-condition), or it may be considered that the signal quality of the first reference signal does not meet the third sub-condition (or it is considered that the second signal quality of the first reference signal does not meet the third sub-condition).

Each of the at least one reference signal may correspond to one piece of first signal quality. First signal quality corresponding to one reference signal may be used to determine whether second signal quality of the reference signal meets a corresponding condition, for example, determine whether the second signal quality of the reference signal meets the third sub-condition or a fourth sub-condition. Different reference signals may correspond to same first signal quality or different first signal quality. The at least one reference signal corresponds to at least one piece of first signal quality. The at least one piece of first signal quality may be preset. For one reference signal, first signal quality corresponding to the reference signal may be set in the following manner; After the terminal device completes cell selection or cell reselection, the terminal device sets the first signal quality corresponding to the reference signal to second signal quality of the reference signal. Alternatively, when second signal quality of the reference signal is higher than the first signal quality corresponding to the reference signal, the terminal device sets the first signal quality corresponding to the reference signal to the second signal quality of the reference signal. Alternatively, when duration in which the terminal device meets the second condition reaches second duration, the terminal device sets the first signal quality corresponding to the reference signal to second signal quality of the reference signal. In other words, the first signal quality corresponding to the reference signal is initially equal to the second signal quality of the reference signal. If the second signal quality of the reference signal may change, the first signal quality may also be reset accordingly. Setting the first signal quality corresponding to the reference signal to the second signal quality of the reference signal may be understood as setting a value of the first signal quality corresponding to the reference signal to a value of the second signal quality of the reference signal.

It should be noted that, a value of the first threshold used in Implementation 1 in which the second condition is met may be the same as or different from a value of the first threshold used in Implementation 1 in which the first condition is met and that is described in the embodiment shown in FIG. 2.

In Implementation 1 in which the second condition is met, the terminal device only needs to determine whether second signal quality of one reference signal meets the third sub-condition, but does not need to process excessive reference signals. This is simple.

2. Implementation 2 in which the Terminal Device Meets the Second Condition

If the terminal device determines that signal quality of each of M reference signals in the at least one reference signal meets a third sub-condition, the terminal device determines that the terminal device meets the second condition, where M is an integer greater than or equal to 1, and M is less than or equal to a quantity of the at least one reference signal. It may be considered that the M reference signals are some or all of the at least one reference signal. For example, a value of M is determined by the terminal device, configured by the network device, or specified in a protocol.

After concepts of the first signal quality and the second signal quality are introduced, in Implementation 2 in which the second condition is met, actually, the terminal device needs to determine whether actual signal quality (or current signal quality) of each of the M reference signals meets the third sub-condition, instead of determining whether first signal quality of each of the M reference signals meets the third sub-condition. Therefore, Implementation 2 in which the second condition is met may also be expressed as follows: If the terminal device determines that the second signal quality of each of the M reference signals in the at least one reference signal meets the third sub-condition, the terminal device determines that the terminal device meets the first condition. For example, after receiving the at least one reference signal, the terminal device may obtain the second signal quality of each of the M reference signals. If the terminal device determines that the second signal quality of each of the M reference signals meets the third sub-condition in the first duration, the terminal device considers that the terminal device meets the first condition. For a manner of setting the first signal quality of the reference signal, refer to the foregoing descriptions.

The M reference signals are, for example, M reference signals randomly selected from the at least one reference signal. Such a manner of determining that the terminal device meets the second condition is simple. The terminal device only needs to randomly select the M reference signals to obtain second signal quality of each of the M reference signals, and determines whether signal quality of each reference signal meets the third sub-condition (or determines whether the second signal quality of each reference signal meets the third sub-condition). Therefore, a workload of the terminal device is light, and power consumption is low.

Alternatively, the M reference signals are, for example, reference signals with higher second signal quality in the at least one reference signal. For example, second signal quality of each of the M reference signals is higher than or equal to second signal quality of a reference signal other than the M reference signals in the at least one reference signal. For example, after obtaining the second signal quality of the at least one reference signal, the terminal device may select M reference signals with highest second signal quality from the at least one reference signal, and then determine whether signal quality of each of the M reference signals meets the third sub-condition (or determine whether the second signal quality of each of the M reference signals meets the third sub-condition).

Alternatively, M is greater than or equal to 2, the M reference signals are, for example, M reference signals selected from the at least one reference signal, and the M reference signals include a second reference signal. Second signal quality of the second reference signal is higher than or equal to second signal quality of another reference signal in the at least one reference signal, or the second reference signal is sent through an optimal beam in at least one beam. For example, the M reference signals include a reference signal sent through the optimal beam in the at least one beam, and further include a reference signal sent through another beam different from the optimal beam in the at least one beam. In this manner, both the reference signal sent through the optimal beam and the reference signal sent through the another beam are considered, so that a determining result can be more accurate.

Figure 6:
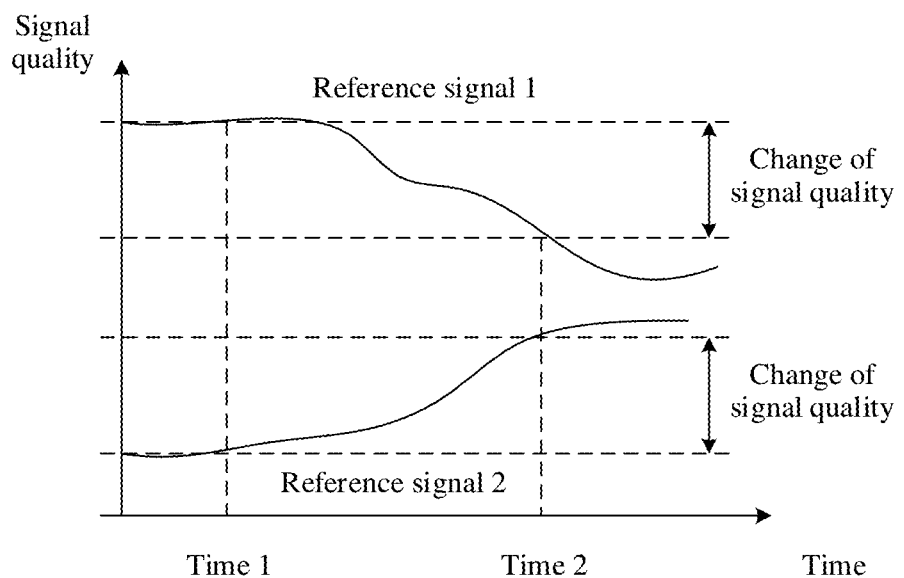
FIG. 6 is a schematic diagram of second signal quality of a reference signal according to an embodiment of this application.

For example, FIG. 6 is a schematic diagram of second signal quality of a reference signal. In FIG. 6, for example, at least one reference signal is three reference signals: a reference signal 1, a reference signal 2, and a reference signal 3, and the reference signal 2 is an optimal reference signal. In FIG. 6, an uppermost curve represents second signal quality of the reference signal 2, a middle curve represents second signal quality of the reference signal 1, and a lowermost curve represents second signal quality of the reference signal 3. For example, a part between two vertical dashed lines in FIG. 6 represents a change amount of the second signal quality of the reference signal. If M reference signals include the reference signal 1 and the reference signal 3, it may be determined, according to Formula 5 or Formula 6, that second signal quality of each of the M reference signals meets the third sub-condition. However, determining performed by using reference signals on a large quantity of beams more conforms to an actual situation of the terminal device.

The third sub-condition may continue to be represented by using Formula 5 or Formula 6. Whether the second signal quality of each of the M reference signals meets the third sub-condition may be determined by using Formula 5 or Formula 6. Similarly, in Implementation 2 in which the second condition is met, the difference between the first signal quality and the second signal quality may be an actual difference, or may be an absolute value of an actual difference. In Implementation 2 in which the second condition is met, in Formula 5 or Formula 6, $S_{beam/ref}$ may represent first signal quality corresponding to one of the M reference signals, and $S_{beam}$ represents second signal quality of the reference signal. A difference between the first signal quality corresponding to the reference signal and the second signal quality of the reference signal may represent a change amount of the second signal quality of the reference signal. If the change amount of the second signal quality of each of the M reference signals is large, that is, greater than or equal to the first threshold, it is considered that signal quality of each of the M reference signals meets the third sub-condition (or it is determined that the second signal quality of each of the M reference signals meets the third sub-condition). Therefore, it is considered that the terminal device meets the second condition. Alternatively, if a change amount of each piece of second signal quality of one or more of the M reference signals is small, for example, the change amount of each piece of the second signal quality of the reference signals is less than the first threshold, it is considered that the second signal quality of the reference signals does not meet the third sub-condition (or it is considered that the second signal quality of the reference signals does not meet the third sub-condition). Therefore, it is considered that the terminal device does not meet the second condition. For one reference signal, if $S_{beam/ref} - S_{beam}$=First threshold (or $S_{beam} - S_{beam/ref}$=First threshold), it may be considered that the signal quality of the reference signal meets the third sub-condition (or it is considered that the second signal quality of the reference signal meets the third sub-condition), or it may be considered that the signal quality of the reference signal does not meet the third sub-condition (or it is considered that the second signal quality of the reference signal does not meet the third sub-condition).

It should be noted that a value of the first threshold used in Implementation 2 in which the second condition is met may be the same as or different from a value of the first threshold used in Implementation 1 in which the second condition is met. The value of the first threshold used in Implementation 2 in which the second condition is met may be the same as or different from a value of the first threshold used in Implementation 2 in which the first condition is met and that is described in the embodiment shown in FIG. 2.

In Implementation 2 in which the second condition is met, the terminal device may consider second signal quality of a plurality of reference signals, and determine whether the second signal quality of the plurality of reference signals meets the third sub-condition, to improve accuracy of a determining result.

3. Implementation 3 in which the Terminal Device Meets the Second Condition

The terminal device obtains first information based on the signal quality of the at least one reference signal, and if the terminal device determines that the first information meets a fourth sub-condition, the terminal device determines that the terminal device meets the second condition.

Obtaining the first information based on the signal quality of the at least one reference signal may be obtaining the first information based on at least one piece of second signal quality and at least one piece of first signal quality of the at least one reference signal. For a manner of setting the first signal quality of the reference signal, refer to the foregoing descriptions. For example, in a manner of obtaining the first information, the first information may be obtained by using Formula 3 or Formula 4 shown in FIG. 2. Details are not described again.

The fourth sub-condition includes, for example, that S is greater than or equal to a second threshold. If S is equal to the second threshold, it may be considered that the fourth sub-condition is met, or it may be considered that the fourth sub-condition is not met. Alternatively, the fourth sub-condition includes, for example, that S/N is greater than or equal to a second threshold. If S/N is equal to the second threshold, it may be considered that the fourth sub-condition is met, or it may be considered that the fourth sub-condition is not met. The second threshold may be determined by the terminal device, configured by the network device, or specified in a protocol. It should be noted that, a value of the second threshold used in Implementation 3 in which the second condition is met may be the same as or different from a value of the second threshold used in Implementation 3 in which the first condition is met and that is described in the embodiment shown in FIG. 2.

In addition, it should be noted that a value of the second threshold used in Implementation 3 in which the second condition is met may be the same as or different from a value of the second threshold used in Implementation 3 in which the first condition is met and that is described in the embodiment shown in FIG. 2. If a value of the first threshold used in Implementation 2 in which the second condition is met is different from a value of the first threshold used in Implementation 1 in which the second condition is met, the value of the first threshold used in Implementation 1 in which the second condition is met may be the same as or different from the value of the second threshold herein, and the value of the first threshold used in Implementation 2 in which the second condition is met may be the same as or different from the value of the second threshold herein.

In Implementation 3 in which the second condition is met, the terminal device may obtain the first information based on the at least one piece of signal quality of the at least one reference signal, and determine whether the first information meets the fourth sub-condition, that is, comprehensively determine whether the signal quality of the at least one reference signal meets the fourth sub-condition, to improve accuracy of a determining result.

4. Implementation 4 in which the Terminal Device Meets the Second Condition

If the terminal device determines that signal quality of a reference signal of the serving cell meets a third sub-condition, the terminal device may determine that the terminal device meets the second condition. In Implementation 4 in which the second condition is met, a direction of a reference signal sent by the network device may not be considered. For example, because the network device does not send the reference signal through a beam, the direction of the reference signal received by the terminal device is not considered.

After concepts of the first signal quality and the second signal quality are introduced, in Implementation 4 in which the second condition is met, actually, the terminal device needs to determine whether actual signal quality (or current signal quality) of the reference signal of the serving cell meets the third sub-condition, instead of determining whether first signal quality of the reference signal of the serving cell meets the third sub-condition. Therefore, Implementation 4 in which the second condition is met may also be expressed as follows: If the terminal device determines that the second signal quality of the reference signal of the serving cell meets the third sub-condition, the terminal device determines that the terminal device meets the second condition. For example, after receiving the reference signal of the serving cell, the terminal device may obtain the second signal quality of the reference signal. If the terminal device determines that the second signal quality of the reference signal meets the third sub-condition, the terminal device considers that the terminal device meets the second condition. For a manner of setting the first signal quality of the reference signal, refer to the foregoing descriptions.

The third sub-condition may continue to be represented by using Formula 5 or Formula 6. Whether the second signal quality of the reference signal of the serving cell meets the third sub-condition may be determined by using Formula 5 or Formula 6. Similarly, in Implementation 4 in which the second condition is met, the difference between the first signal quality and the second signal quality may be an actual difference, or may be an absolute value of an actual difference. In Implementation 4 in which the second condition is met, in Formula 5 or Formula 6, $S_{beam/ref}$ may represent first signal quality corresponding to the reference signal, and $S_{beam}$ represents second signal quality of the reference signal. A difference between the first signal quality corresponding to the reference signal and the second signal quality of the reference signal may represent a change amount of the second signal quality of the reference signal. If the change amount of the second signal quality of the reference signal is large, that is, greater than or equal to the first threshold, it is considered that signal quality of the reference signal meets the third sub-condition (or it is determined that the second signal quality of the reference signal meets the third sub-condition). Therefore, it is considered that the terminal device meets the second condition. Alternatively, if the change amount of the second signal quality of the reference signal is small, for example, the change amount of the second signal quality of the reference signal is less than the first threshold, it is considered that the second signal quality of the reference signal does not meet the third sub-condition (or it is considered that the second signal quality of the reference signal does not meet the third sub-condition). Therefore, it is considered that the terminal device does not meet the second condition. For the reference signal, if $S_{beam/ref}-S_{beam}$=First threshold (or $S_{beam}-S_{beam/ref}$=First threshold), it may be considered that the signal quality of the reference signal meets the third sub-condition (or it is considered that the second signal quality of the reference signal meets the third sub-condition), or it may be considered that the signal quality of the reference signal does not meet the third sub-condition (or it is considered that the second signal quality of the reference signal does not meet the third sub-condition).

It should be noted that, a value of the first threshold used in Implementation 4 in which the second condition is met may be the same as or different from a value of the first threshold used in Implementation 4 in which the first condition is met and that is described in the embodiment shown in FIG. 2. In addition, a value of the first threshold used in Implementation 2 in which the second condition is met, a value of the first threshold used in Implementation 1 in which the second condition is met, and a value of the first threshold used in Implementation 4 in which the second condition is met may be the same or different, or values of any two of the three first thresholds may be different from a value of the other first threshold.

Certainly, determining that the terminal device meets the second condition is not limited to the foregoing four implementations. This is not specifically limited.

In addition, the terminal device may further determine a location of the terminal device in a cell based on the signal quality (for example, second signal quality) of the at least one reference signal. The cell herein is the serving cell of the terminal device. For example, based on the signal quality of the at least one reference signal, the terminal device may determine that the terminal device is located at a center location of the cell, or determine that the terminal device does not meet a criterion for performing neighboring cell measurement. The criterion for performing neighboring cell measurement that is not met may be a criterion S. The criterion S means that power of a current serving cell of the terminal device is less than or equal to a power threshold for enabling neighboring cell measurement, signal quality of a current serving cell of the terminal device is less than or equal to a signal quality threshold for enabling neighboring cell measurement, or power of a current serving cell of the terminal device is less than or equal to a power threshold for enabling neighboring cell measurement, and signal quality of a current serving cell of the terminal device is less than or equal to a signal quality threshold for enabling neighboring cell measurement. A sending direction of the at least one reference signal is clear. The network device may send sending direction information (or a correspondence between a beam and a location of a cell) of the at least one reference signal to the terminal device, and may further send an identifier of the at least one reference signal to the terminal, so that the terminal device can learn of a correspondence between each beam and a corresponding location in the cell. Further, if second signal quality that is of a reference signal in the at least one reference signal and that is obtained by the terminal device through measurement is higher, it may indicate that the terminal device is in or near a sending direction of the reference signal. For example, the terminal device may determine whether the terminal device is located at a center location of the cell or an edge location of the cell. For example, the at least one reference signal includes a reference signal 1 sent through a beam 1, and a sending direction of the beam 1 points to a center of the cell. If second signal quality that is of the reference signal 1 and that is obtained by the terminal device through measurement is highest, it may indicate that the terminal device is located at or near the center location of the cell.

In an optional implementation, before determining that the terminal device meets the second condition, that is, before S52, the terminal device may first determine whether a condition for performing neighboring cell intra-frequency or inter-frequency measurement is met. If the condition for performing neighboring cell measurement is met, the terminal device may continue to determine whether the terminal device meets the second condition, that is, perform S52. If the condition for performing neighboring cell measurement is not met, the terminal device may no longer need to perform S52 and S53 or directly not perform the relaxed measurement rule. Therefore, the procedure may end.

In another optional implementation, the network device may also send indication information to the terminal device, where the indication information is used to indicate whether the terminal device can perform determining or an operation on whether the relaxed measurement rule is met. Assuming that the indication information indicates the terminal device not to perform the relaxed measurement rule, the terminal device may not need to perform S52, but may directly perform S53.

Alternatively, if the terminal device determines that the terminal device is located at the edge location of the cell, the terminal device may continue to perform S22 in the embodiment shown in FIG. 2. For details, refer to descriptions of S22.

Alternatively, if the terminal device determines that the terminal device is located at the edge location of the cell, the terminal device may continue to perform S52. However, in this case, a threshold (for example, a first threshold, a second threshold, or a first threshold and a second threshold) used by the terminal device located at the edge location of the call when the terminal device determines whether the terminal device meets the second condition may be the same as or different from a threshold used by the terminal device located at the center location of the cell when the terminal device determines whether the terminal device meets the second condition. For example, a value of a first threshold used by the terminal device at the edge of the cell when the terminal device determines whether the terminal device meets the second threshold may be the same as or different from a value of a first threshold used by the terminal device at the center of the cell when the terminal device determines whether the terminal device meets the second condition. If the values of the two first thresholds are different, the value of the first threshold used by the terminal device at the center of the cell may be less than the value of the first threshold used by the terminal device at the edge of the cell. For another example, the terminal device at the edge of the cell uses a second threshold when determining whether the terminal device meets the second threshold, and the terminal device at the center of the cell also uses a second threshold when determining whether the terminal device meets the second condition. Values of the two second thresholds may be the same or different. If the values of the two second thresholds are different, the value of the second threshold used by the terminal device at the center of the cell may be less than the value of the second threshold used by the terminal device at the edge of the cell.

For the terminal device at the center of the cell, a probability that the serving cell changes is low, and a probability of performing cell handover or reselection is low. Even if neighboring cell measurement is not performed, normal work may not be affected. In other words, the terminal device at the center of the cell may not need to perform neighboring cell measurement. Therefore, a value of a threshold used by the terminal device at the center of the cell may be small, so that the terminal device cannot easily meet the second condition, and therefore have a higher probability of performing the relaxed measurement rule. In an extreme case, the terminal device may be configured to always perform relaxed measurement. If the terminal device at the edge of the cell is in a moving state, a probability that the serving cell changes is high, and a probability of performing cell handover or reselection is high. In this case, neighboring cell measurement needs to be performed to assist in selecting a new cell. Therefore, a value of a threshold used by the terminal device at the edge of the cell may be large, so that the terminal device can easily meet the second condition, and therefore can perform neighboring cell measurement more frequently or for a longer time.

Thresholds (for example, a first threshold, a second threshold, or a first threshold and a second threshold) used by the terminal devices at the different locations may be determined by the terminal device, configured by the network device, or specified in a protocol.

It should be noted herein that a location that is of the terminal device and that is determined by using a reference signal is not limited to only two levels: the center location of the cell and the edge location of the cell. In this embodiment, the two locations are used merely for description. Because reference signals have many directions, a more precise cell location may be determined by using the reference signal for division, to set more precise and different measurement criteria for the terminal devices at the different locations.

The reference signal in this embodiment of this application includes but is not limited to one or any combination of the following: an SSB, a CSI-RS, a PBCH block, or a CRS. For example, in this embodiment of this application, the reference signal includes the SSB, the reference signal includes the CSI-RS, the reference signal includes the SSB and the PBCH block, the reference signal includes the CSI-RS, the CRS, and the SSB, or the reference signal includes the SSB, the CSI-RS, the PBCH block, and the CRS.

S53: The terminal device determines that the terminal device does not meet a first measurement rule.

For example, the first measurement rule is also referred to as a relaxed measurement rule. Relaxed measurement is relative to common measurement (measurement performed when relaxed measurement is not performed, which may also be referred to as a second measurement rule). When performing common measurement, the terminal device performs periodic or event-triggered measurement on a signal. When meeting the relaxed measurement rule, the terminal device may perform measurement according to the first measurement rule. For example, the terminal device may choose not to perform intra-frequency measurement or inter-frequency measurement in a period of time.

If the terminal device determines that the terminal device meets the second condition, the terminal device may consider that the terminal device does not meet the relaxed measurement rule. In this case, the terminal device may perform intra-frequency measurement or inter-frequency measurement. However, the terminal device only determines that intra-frequency measurement or inter-frequency measurement can be performed. Whether the terminal device needs to perform measurement depends on the implementation of the terminal device. This is not limited in this embodiment of this application.

In addition, if the terminal device determines that the terminal device meets the second condition, the terminal device may also consider that the terminal device is in a moving state, or the terminal device is not in a static state. In this case, it may be considered that the terminal device does not meet the relaxed measurement rule, and further there may be another purpose, for example, the terminal device may further determine that a TA changes. Both the terminal device and the network device can re-determine a TA. Therefore, the network device may schedule the terminal device by using a new TA, or the terminal device may communicate with the network device by using a new TA, to ensure a normal communication process, and reduce a scheduling failure probability.

In this embodiment of this application, the terminal device may determine, based on the signal quality of the at least one reference signal of the serving cell of the terminal device, that the terminal device does not meet the relaxed measurement rule. The at least one reference signal corresponds to different sending directions, that is, direction information may be added when the terminal device determines whether the terminal device meets the relaxed measurement rule, so that accuracy of a determining result can be improved. If the terminal device does not meet the relaxed measurement rule, the terminal device may continue to perform a measurement process, so that when cell handover needs to be performed, a proper cell can be selected in a timely manner through measurement, to ensure a normal communication process of the terminal device, and reduce impact on the communication process of the terminal device.

The following describes, with reference to the accompanying drawings, apparatuses configured to implement the foregoing method in the embodiments of this application. Therefore, all the foregoing content may be used in the following embodiments. Repeated content is not described again.

Figure 7:
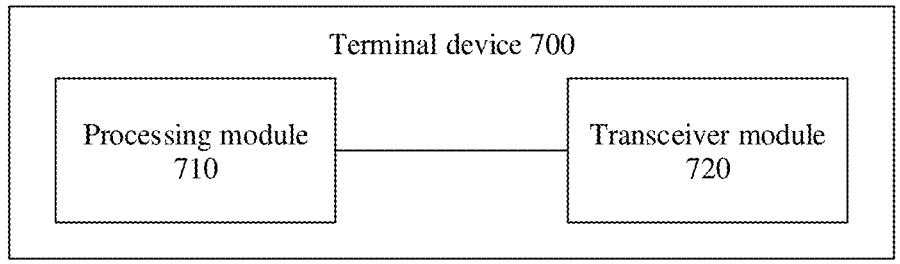
FIG. 7 is a schematic block diagram of a first terminal device according to an embodiment of this application.

FIG. 7 is a schematic block diagram of a communications apparatus 700 according to an embodiment of this application. For example, the communications apparatus 700 is a terminal device 700.

The terminal device 700 includes a processing module 710 and a transceiver module 720. For example, the terminal device 700 may be a terminal device, or may be a chip applied to the terminal device, or another combined device or a component that has the functions of the terminal device. When the terminal device 700 is the terminal device, the transceiver module 720 may be a transceiver, and may include an antenna, a radio frequency circuit, and the like; and the processing module 710 may be a processor, for example, a baseband processor. The baseband processor may include one or more central processing units (CPUs). When the terminal device 700 is the component having the functions of the terminal, the transceiver module 720 may be a radio frequency unit, and the processing module 710 may be a processor, for example, a baseband processor. When the terminal device 700 is a chip system, the transceiver module 720 may be an input/output interface in the chip system (for example, a baseband chip), and the processing module may be a processor in the chip system, and may include one or more central processing units.

The processing module 710 may be configured to perform all operations performed by the terminal device in the embodiment shown in FIG. 2 except the receiving and sending operations, for example, S22 and S23, and/or configured to support another process of the technology described in this specification. The transceiver module 720 may be configured to perform all the receiving and sending operations performed by the terminal device in the embodiment shown in FIG. 2, for example, S21, and/or configured to support another process of the technology described in this specification.

In addition, the transceiver module 720 may be a functional module. The functional module can implement both a sending operation and a receiving operation. For example, the transceiver module 720 may be configured to perform all sending operations and receiving operations performed by the terminal device in the embodiment shown in FIG. 2. For example, when a sending operation is performed, it may be considered that the transceiver module 720 is a sending module, and when a receiving operation is performed, it may be considered that the transceiver module 720 is a receiving module. Alternatively, the transceiver module 720 may be a general term of two functional modules. The two functional modules are respectively a sending module and a receiving module. The sending module is configured to implement a sending operation. For example, the sending module may be configured to perform all sending operations performed by the terminal device in the embodiment shown in FIG. 2. The receiving module is configured to implement a receiving operation. For example, the receiving module may be configured to perform all receiving operations performed by the terminal device in the embodiment shown in FIG. 2.

For example, the processing module 710 is configured to determine, based on signal quality of at least one reference signal of a serving cell, that the terminal device 700 meets a first condition, where the at least one reference signal corresponds to at least one sending direction.

The processing module 710 is further configured to perform measurement according to a first measurement rule.

For example, the first measurement rule may include: skipping performing intra-frequency measurement or inter-frequency measurement. Alternatively, the first measurement rule may include one or any combination of the following: reducing to-be-measured bandwidth, reducing a quantity of to-be-measured cells, reducing a quantity of to-be-measured bandwidth parts (BWPs), or reducing a quantity of to-be-measured frequencies. For example, the first measurement rule may include: reducing the to-be-measured bandwidth. Alternatively, the first measurement rule may include: reducing the quantity of to-be-measured cells and reducing the quantity of to-be-measured frequencies. Alternatively, the first measurement rule may include: reducing the to-be-measured bandwidth, reducing the quantity of to-be-measured cells, and reducing the quantity of to-be-measured frequencies. A second measurement rule may be a normal measurement rule, that is, when a criterion S for neighboring cell measurement is met, the terminal device normally performs periodic or event-triggered intra-frequency measurement or inter-frequency measurement.

The first measurement rule may also be referred to as a relaxed measurement rule. Relaxed measurement is relative to common measurement (measurement performed when relaxed measurement is not performed, which may also be referred to as the second measurement rule). When performing common measurement, the terminal device performs periodic or event-triggered measurement on a signal. When meeting the relaxed measurement rule, the terminal device may perform measurement according to the first measurement rule. For example, the terminal device may choose not to perform intra-frequency measurement or inter-frequency measurement in a period of time.

In an optional implementation, the processing module 710 is configured to determine, based on the signal quality of the at least one reference signal of the serving cell of the terminal device 700 in the following manner, that the terminal device 700 meets the first condition:

if determining that signal quality of a first reference signal of the serving cell meets a first sub-condition in first duration, determining that the terminal device 700 meets the first condition, where the signal quality of the first reference signal is higher than signal quality of another reference signal in the at least one reference signal; or if determining that signal quality of each of M reference signals in the at least one reference signal meets a first sub-condition in first duration, determining that the terminal device 700 meets the first condition, where M is an integer greater than or equal to 1, and M is less than or equal to a quantity of the at least one reference signal; or obtaining first information based on the signal quality of the at least one reference signal, and if determining that the first information meets a second sub-condition in first duration, determining that the terminal device 700 meets the first condition.

In an optional implementation, the processing module 710 is further configured to: based on the signal quality of the at least one reference signal, determine that the terminal device 700 is located at an edge location of the serving cell of the terminal device 700, or determine that the terminal device 700 meets a criterion for performing neighboring cell measurement.

In an optional implementation, the first sub-condition includes:

a difference between first signal quality of one reference signal and second signal quality of the one reference signal is less than or equal to a first threshold, where the first signal quality of the one reference signal is reference signal quality corresponding to the one reference signal, and the second signal quality of the one reference signal is current signal quality of the one reference signal.

In an optional implementation, the first information satisfies the following formula:

$$S=\sum_{i=1}^{N}(S_{ref,i}-S_i)^2 \text{ or } S=\sum_{i=1}^{N}|(S_{ref,i}-S_i)|, \text{ where}$$

S represents the first information, i represents a sequence number of an $i^{th}$ reference signal in the at least one reference signal, N represents the quantity of the at least one reference signal, $S_i$ represents second signal quality of the $i^{th}$ reference signal, and $S_{ref,i}$ represents first signal quality of the $i^{th}$ reference signal.

In an optional implementation, the second sub-condition includes:

S is less than or equal to a second threshold, or S/N is less than or equal to a second threshold.

In an optional implementation, the processing module 710 is further configured to:

after the terminal device 700 completes cell selection or cell reselection, when the second signal quality of the one reference signal is higher than the first signal quality of the one reference signal, or when duration in which the terminal device 700 does not meet the first condition reaches second duration, set the first signal quality of the one reference signal to the second signal quality of the one reference signal.

In an optional implementation, the processing module 710 is further configured to:

before skipping performing intra-frequency measurement or inter-frequency measurement, determine that duration since cell reselection is last performed is less than or equal to third duration.

In an optional implementation, the processing module 710 is further configured to: before skipping performing intra-frequency measurement or inter-frequency measurement, determine that duration in which the terminal device 700 performs intra-frequency measurement or inter-frequency measurement since cell selection or cell reselection is last performed is greater than or equal to the first duration.

It should be understood that the processing module 710 in this embodiment of this application may be implemented by a processor or a processor-related circuit component, and the transceiver module 720 may be implemented by a transceiver or a transceiver-related circuit component.

Figure 8:
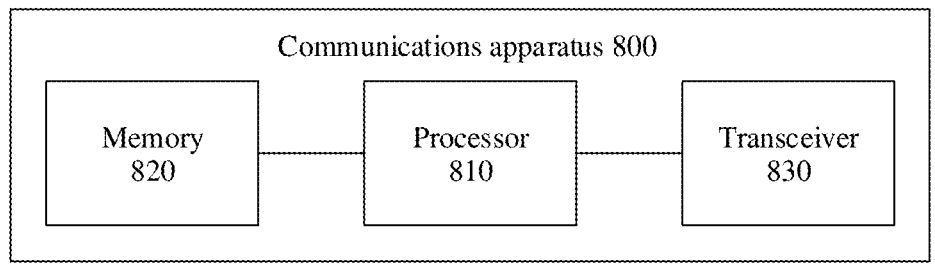
FIG. 8 is another schematic block diagram of a first terminal device according to an embodiment of this application.

As shown in FIG. 8, an embodiment of this application further provides a communications apparatus 800. For example, the communications apparatus 800 is a terminal device 800. For example, the terminal device 800 may be a communications device, for example, a terminal device, or may be a chip system. The terminal device 800 includes a processor 810. Optionally, the terminal device 800 may further include a memory 820. Optionally, the terminal device 800 may further include a transceiver 830. The memory 820 stores computer instructions or a program, and the processor 810 may execute the computer instructions or the program stored in the memory 820. When the computer instructions or the program stored in the memory 820 is executed, the processor 810 is configured to perform an operation performed by the processing module 710 in the foregoing embodiment, and the transceiver 830 is configured to perform an operation performed by the transceiver module 720 in the foregoing embodiment. Alternatively, the terminal device 800 may not include the memory 820. For example, the memory is located outside the terminal device 800. When the computer instructions or the program stored in the external memory is executed, the processor 810 is configured to perform an operation performed by the processing module 710 in the foregoing embodiment, and the transceiver 830 is configured to perform an operation performed by the transceiver module 720 in the foregoing embodiment.

The transceiver 830 may be a functional unit. The functional unit can implement both a sending operation and a receiving operation. For example, the transceiver 830 may be configured to perform all sending operations and receiving operations performed by the terminal device in the embodiment shown in FIG. 2. For example, when a sending operation is performed, it may be considered that the transceiver 830 is a transmitter, and when a receiving operation is performed, it may be considered that the transceiver 830 is a receiver. Alternatively, the transceiver 830 may be a general term of two functional units. The two functional units are respectively a transmitter and a receiver. The transmitter is configured to implement a sending operation. For example, the transmitter may be configured to perform all sending operations performed by the terminal device in the embodiment shown in FIG. 2. The receiver is configured to implement a receiving operation. For example, the receiver may be configured to perform all receiving operations performed by the terminal device in the embodiment shown in FIG. 2.

In addition, if the communications apparatus 800 is the chip system, the transceiver 830 may also be implemented by using a communications interface of the chip system. The communications interface is connected to a radio frequency transceiver component in the communications device, to implement information receiving and sending by using the radio frequency transceiver component. The communications interface may be a functional unit. The functional unit can implement both a sending operation and a receiving operation. For example, the communications interface may be configured to perform all sending operations and receiving operations performed by the terminal device in the embodiment shown in FIG. 2. For example, when a sending operation is performed, it may be considered that the communications interface is a sending interface, and when a receiving operation is performed, it may be considered that the communications interface is a receiving interface. Alternatively, the communications interface may be a general term of two functional units. The two functional units are respectively a sending interface and a receiving interface. The sending interface is configured to implement a sending operation. For example, the sending interface may be configured to perform all sending operations performed by the terminal device in the embodiment shown in FIG. 2. The receiving interface is configured to implement a receiving operation. For example, the receiving interface may be configured to perform all receiving operations performed by the terminal device in the embodiment shown in FIG. 2.

It should be understood that the terminal device 700 or the terminal device 800 in the embodiments of this application may implement the functions of the terminal device in the embodiment shown in FIG. 2, and operations and/or functions of the modules in the terminal device 700 or the terminal device 800 are intended to implement corresponding procedures in the embodiment shown in FIG. 2. For brevity, details are not described herein again.

Figure 9:
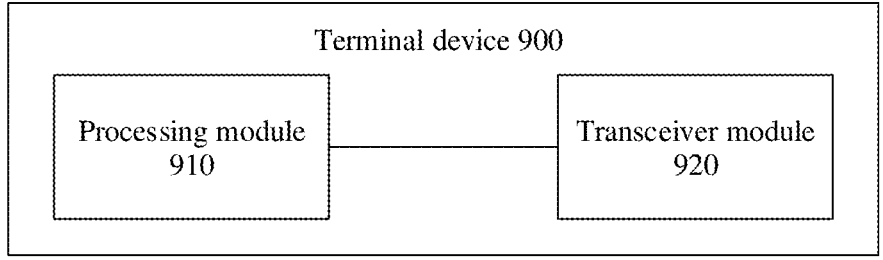
FIG. 9 is a schematic block diagram of a second terminal device according to an embodiment of this application.

FIG. 9 is a schematic block diagram of a communications apparatus 900 according to an embodiment of this application. For example, the communications apparatus 900 is a terminal device 900.

The terminal device 900 includes a processing module 910 and a transceiver module 920. For example, the terminal device 900 may be a terminal device, or may be a chip applied to the terminal device, or another combined device or a component that has the functions of the terminal device. When the terminal device 900 is the terminal device, the transceiver module 920 may be a transceiver, and may include an antenna, a radio frequency circuit, and the like; and the processing module 910 may be a processor, for example, a baseband processor. The baseband processor may include one or more CPUs. When the terminal device 900 is the component having the functions of the terminal, the transceiver module 920 may be a radio frequency unit, and the processing module 910 may be a processor, for example, a baseband processor. When the terminal device 900 is a chip system, the transceiver module 920 may be an input/output interface in the chip system (for example, a baseband chip), and the processing module may be a processor in the chip system, and may include one or more central processing units.

The processing module 910 may be configured to perform all operations performed by the terminal device in the embodiment shown in FIG. 5 except the receiving and sending operations, for example, S52 and S53, and/or configured to support another process of the technology described in this specification. The transceiver module 920 may be configured to perform all the receiving and sending operations performed by the terminal device in the embodiment shown in FIG. 5, for example, S51, and/or configured to support another process of the technology described in this specification.

In addition, the transceiver module 920 may be a functional module. The functional module can implement both a sending operation and a receiving operation. For example, the transceiver module 920 may be configured to perform all sending operations and receiving operations performed by the terminal device in the embodiment shown in FIG. 5. For example, when a sending operation is performed, it may be considered that the transceiver module 920 is a sending module, and when a receiving operation is performed, it may be considered that the transceiver module 920 is a receiving module. Alternatively, the transceiver module 920 may be a general term of two functional modules. The two functional modules are respectively a sending module and a receiving module. The sending module is configured to implement a sending operation. For example, the sending module may be configured to perform all sending operations performed by the terminal device in the embodiment shown in FIG. 5. The receiving module is configured to implement a receiving operation. For example, the receiving module may be configured to perform all receiving operations performed by the terminal device in the embodiment shown in FIG. 5.

For example, based on signal quality of at least one reference signal of a serving cell of the terminal device 900, the processing module 910 is configured to determine that the terminal device 900 meets a second condition; and the processing module 910 is further configured to determine that the terminal device 900 does not meet a relaxed measurement rule, where the at least one reference signal corresponds to at least one sending direction.

In an optional implementation, the processing module 910 is configured to determine, based on the signal quality of the at least one reference signal of the serving cell of the terminal device 900 in the following manner, that the terminal device 900 meets the second condition:

if determining that signal quality of a first reference signal of the serving cell meets a third sub-condition, determining that the terminal device 900 meets the second condition, where the signal quality of the first reference signal is higher than or equal to signal quality of another reference signal in the at least one reference signal; or if determining that signal quality of each of M reference signals in the at least one reference signal meets a third sub-condition, determining that the terminal device 900 meets the second condition, where M is an integer greater than or equal to 1, and M is less than or equal to a quantity of the at least one reference signal; or obtaining first information based on the signal quality of the at least one reference signal, and if determining that the first information meets a fourth sub-condition, determining that the terminal device 900 meets the second condition.

In an optional implementation, the processing module 910 is further configured to: based on the signal quality of the at least one reference signal, determine that the terminal device 900 is located at a center location of the serving cell of the terminal device 900, or determine that the terminal device 900 does not meet a criterion for performing neighboring cell measurement.

In an optional implementation, the third sub-condition includes:

a difference between first signal quality of one reference signal and second signal quality of the one reference signal is greater than or equal to a first threshold, where the first signal quality of the one reference signal is reference signal quality corresponding to the one reference signal, and the second signal quality of the one reference signal is current signal quality of the one reference signal.

In an optional implementation, the first information satisfies the following formula:

$S=\Sigma_{i=1}^{N}(S_{ref,i}-S_i)^2$ or $S=\Sigma_{i=1}^{N}|(S_{ref,i}-S_i)|$, where S represents the first information, i represents a sequence number of an $i^{th}$ reference signal in the at least one reference signal, N represents the quantity of the at least one reference signal, $S_i$ represents second signal quality of the $i^{th}$ reference signal, and $S_{ref,i}$ represents first signal quality of the $i^{th}$ reference signal.

In an optional implementation, the fourth sub-condition includes:

S is greater than or equal to a second threshold, or S/N is greater than or equal to a second threshold.

In an optional implementation, the processing module 910 is further configured to:

after the terminal device 900 completes cell selection or cell reselection, when the second signal quality of the one reference signal is higher than the first signal quality of the one reference signal, or when duration in which the terminal device 900 meets the second condition reaches first duration, set the second signal quality of the one reference signal to the first signal quality of the one reference signal.

In an optional implementation, the processing module 910 is further configured to perform intra-frequency measurement or inter-frequency measurement.

It should be understood that the processing module 910 in this embodiment of this application may be implemented by a processor or a processor-related circuit component, and the transceiver module 920 may be implemented by a transceiver or a transceiver-related circuit component.

Figure 10:
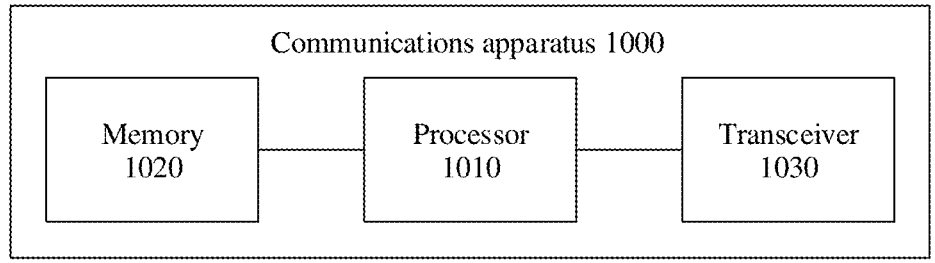
FIG. 10 is another schematic block diagram of a second terminal device according to an embodiment of this application.

As shown in FIG. 10, an embodiment of this application further provides a communications apparatus 1000. For example, the communications apparatus 1000 is a terminal device 1000. For example, the terminal device 1000 may be a communications device, for example, a terminal device, or may be a chip system. The terminal device 1000 includes a processor 1010. Optionally, the terminal device 1000 may further include a memory 1020. Optionally, the terminal device 1000 may further include a transceiver 1030. The memory 1020 stores computer instructions or a program, and the processor 1010 may execute the computer instructions or the program stored in the memory 1020. When the computer instructions or the program stored in the memory 1020 is executed, the processor 1010 is configured to perform an operation performed by the processing module 910 in the foregoing embodiment, and the transceiver 1030 is configured to perform an operation performed by the transceiver module 920 in the foregoing embodiment. Alternatively, the terminal device 1000 may not include the memory 1020. For example, the memory is located outside the terminal device 1000. When the computer instructions or the program stored in the external memory is executed, the processor 1010 is configured to perform an operation performed by the processing module 910 in the foregoing embodiment, and the transceiver 930 is configured to perform an operation performed by the transceiver module 920 in the foregoing embodiment.

The transceiver 1030 may be a functional unit. The functional unit can implement both a sending operation and a receiving operation. For example, the transceiver 1030 may be configured to perform all sending operations and receiving operations performed by the terminal device in the embodiment shown in FIG. 5. For example, when a sending operation is performed, it may be considered that the transceiver 1030 is a transmitter, and when a receiving operation is performed, it may be considered that the transceiver 1030 is a receiver. Alternatively, the transceiver 1030 may be a general term of two functional units. The two functional units are respectively a transmitter and a receiver. The transmitter is configured to implement a sending operation. For example, the transmitter may be configured to perform all sending operations performed by the terminal device in the embodiment shown in FIG. 5. The receiver is configured to implement a receiving operation. For example, the receiver may be configured to perform all receiving operations performed by the terminal device in the embodiment shown in FIG. 5.

In addition, if the communications apparatus 1000 is the chip system, the transceiver 1030 may also be implemented by using a communications interface of the chip system. The communications interface is connected to a radio frequency transceiver component in the communications device, to implement information receiving and sending by using the radio frequency transceiver component. The communications interface may be a functional unit. The functional unit can implement both a sending operation and a receiving operation. For example, the communications interface may be configured to perform all sending operations and receiving operations performed by the terminal device in the embodiment shown in FIG. 5. For example, when a sending operation is performed, it may be considered that the communications interface is a sending interface, and when a receiving operation is performed, it may be considered that the communications interface is a receiving interface. Alternatively, the communications interface may be a general term of two functional units. The two functional units are respectively a sending interface and a receiving interface. The sending interface is configured to implement a sending operation. For example, the sending interface may be configured to perform all sending operations performed by the terminal device in the embodiment shown in FIG. 5. The receiving interface is configured to implement a receiving operation. For example, the receiving interface may be configured to perform all receiving operations performed by the terminal device in the embodiment shown in FIG. 5.

It should be understood that the terminal device 900 or the terminal device 1000 in the embodiments of this application may implement the functions of the terminal device in the embodiment shown in FIG. 5, and operations and/or functions of the modules in the terminal device 900 or the terminal device 1000 are intended to implement corresponding procedures in the embodiment shown in FIG. 5. For brevity, details are not described herein again.

An embodiment of this application further provides a communications apparatus. The communications apparatus may be a terminal device or a circuit. The communications apparatus may be configured to perform an action performed by the terminal device in the foregoing method embodiments.

Figure 11:
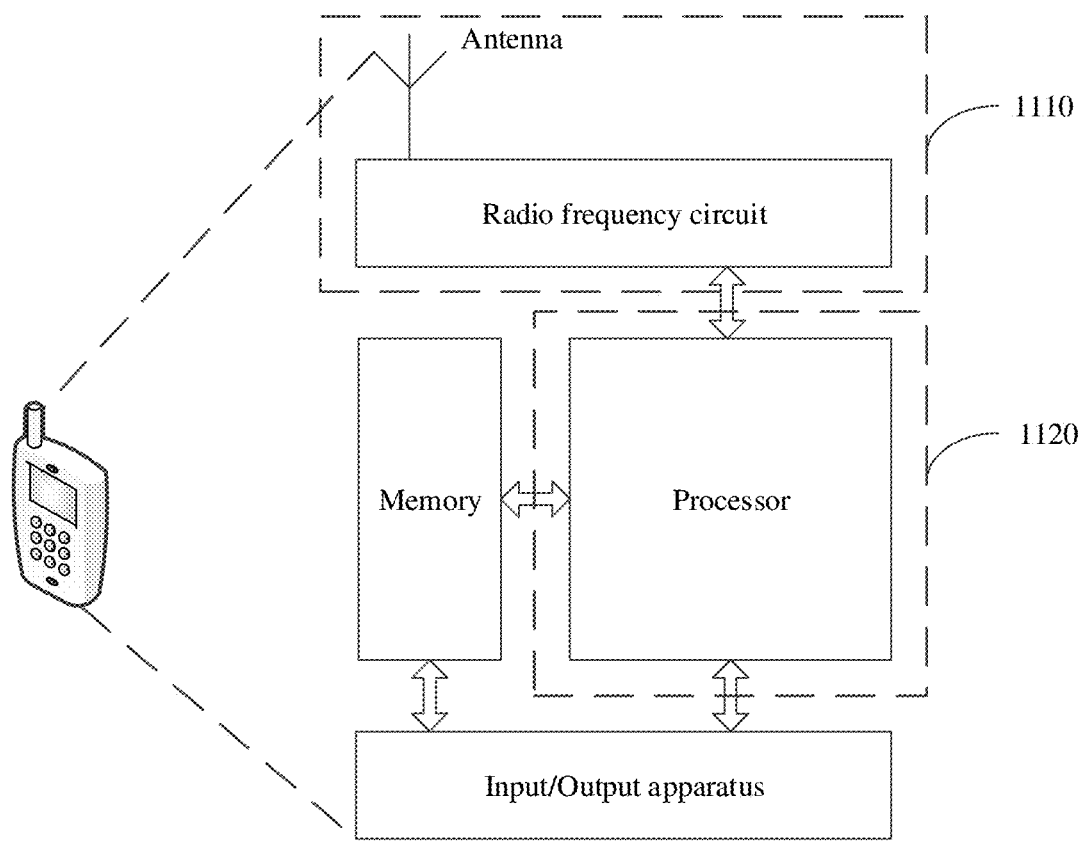
FIG. 11 is a schematic block diagram of a communications apparatus according to an embodiment of this application.

When the communication apparatus is a terminal device, FIG. 11 is a simplified schematic diagram of a structure of a terminal device. For ease of understanding and ease of illustration, an example in which the terminal device is a mobile phone is used in FIG. 11. As shown in FIG. 11, the terminal device includes a processor, a memory, a radio frequency circuit, an antenna, and an input/output apparatus. The processor is mainly configured to: process a communications protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to: receive and send a radio frequency signal in a form of an electromagnetic wave. The input/output apparatus, for example, a touchscreen, a display, or a keyboard, is mainly configured to: receive data entered by a user, and output data to the user. It should be noted that some types of terminal devices may have no input/output apparatus.

When data needs to be sent, the processor performs baseband processing on the to-be-sent data, and then outputs a baseband signal to the radio frequency circuit. The radio frequency circuit performs radio frequency processing on the baseband signal, and then sends a radio frequency signal in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 11 shows only one memory and one processor. An actual terminal device product may include one or more processors and one or more memories. The memory may also be referred to as a storage medium, a storage device, or the like. The memory may be disposed independent of the processor, or may be integrated into the processor. This is not limited in this embodiment of this application.

In the embodiments of this application, the radio frequency circuit and the antenna that has receiving and sending functions may be considered as a transceiver unit of the terminal device, and the processor that has a processing function may be considered as a processing unit of the terminal device. As shown in FIG. 11, the terminal device includes a transceiver unit 1110 and a processing unit 1120. The transceiver unit may also be referred to as a transceiver machine, a transceiver, a transceiver apparatus, or the like. The processing unit may also be referred to as a processor, a processing board, a processing module, a processing apparatus, or the like. Optionally, a component that is in the transceiver unit 1110 and that is configured to implement a receiving function may be considered as a receiving unit, and a component that is in the transceiver unit 1110 and that is configured to implement a sending function may be considered as a sending unit. In other words, the transceiver unit 1110 includes the receiving unit and the sending unit.

The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

It should be understood that the transceiver unit 1110 is configured to perform a sending operation and a receiving operation on the terminal device side in the foregoing method embodiments, and the processing unit 1120 is configured to perform an operation other than the receiving and sending operations of the terminal device in the foregoing method embodiments.

For example, in an implementation, the transceiver unit 1110 is configured to perform all sending operations and receiving operations performed by the terminal device in the embodiment shown in FIG. 2, for example, S21, and/or the transceiver unit 1110 is further configured to support another process of the technology described in this specification. The processing unit 1120 is configured to perform all operations performed by the terminal device in the embodiment shown in FIG. 2 except the receiving and sending operations, for example, S22 and S23, and/or the processing unit 1120 is further configured to support another process of the technology described in this specification.

For another example, in an implementation, the transceiver unit 1110 is configured to perform all sending operations and receiving operations performed by the terminal device in the embodiment shown in FIG. 5, for example, S51, and/or the transceiver unit 1110 is further configured to support another process of the technology described in this specification. The processing unit 1120 is configured to perform all operations performed by the terminal device in the embodiment shown in FIG. 5 except the receiving and sending operations, for example, S52 and S53, and/or the processing unit 1120 is further configured to support another process of the technology described in this specification.

When the communications apparatus is a chip apparatus or circuit, the apparatus may include a transceiver unit and a processing unit. The transceiver unit may be an input/output circuit and/or a communications interface. The processing unit is an integrated processor, a microprocessor, or an integrated circuit.

Figure 12:
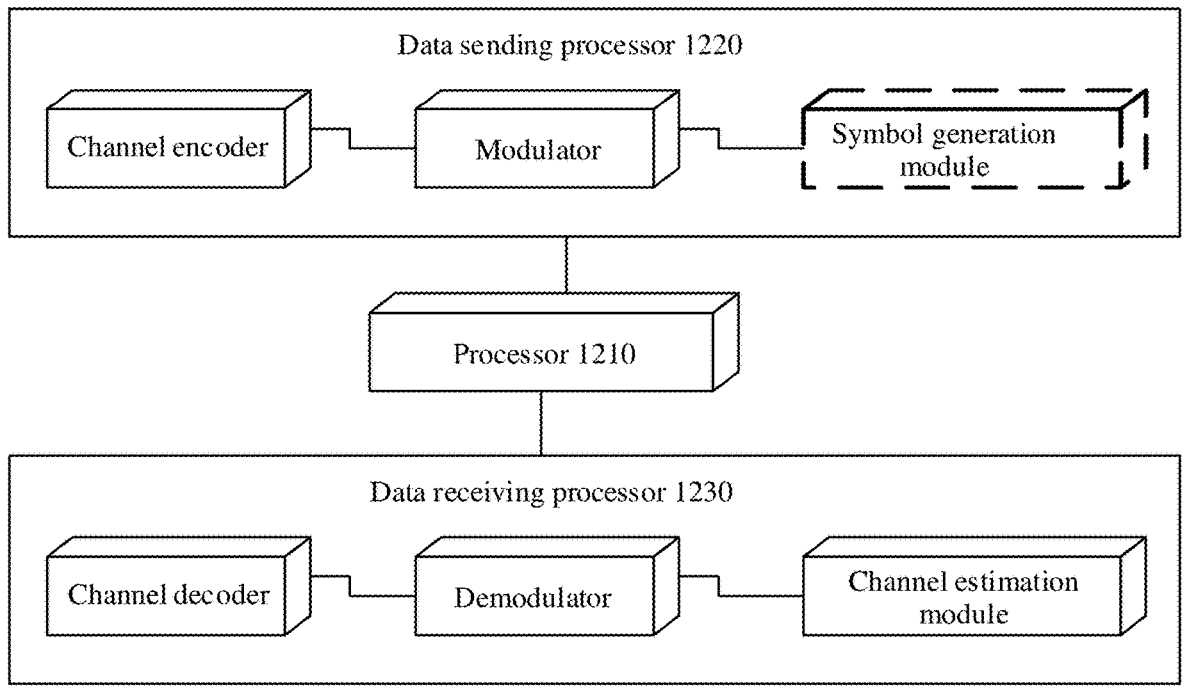
FIG. 12 is another schematic block diagram of a communications apparatus according to an embodiment of this application.

When the communications apparatus in this embodiment is a terminal device, reference may be made to a device shown in FIG. 12. For example, the device can implement functions similar to those of the processor 810 in FIG. 8. Alternatively, in an example, the device can implement functions similar to those of the processor 1010 in FIG. 10. In FIG. 12, the device includes a processor 1210, a data sending processor 1220, and a data receiving processor 1230. The processing module 710 in the foregoing embodiment may be the processor 1210 in FIG. 12, and completes corresponding functions. The transceiver module 720 in the foregoing embodiment may be the data sending processor 1220 and/or the data receiving processor 1230 in FIG. 12. Alternatively, the processing module 910 in the foregoing embodiment may be the processor 1210 in FIG. 12, and completes corresponding functions. The transceiver module 920 in the foregoing embodiment may be the data sending processor 1220 and/or the data receiving processor 1230 in FIG. 12. Although FIG. 12 shows a channel encoder and a channel decoder, it may be understood that the modules are merely examples, and do not constitute a limitation on this embodiment.

Figure 13:
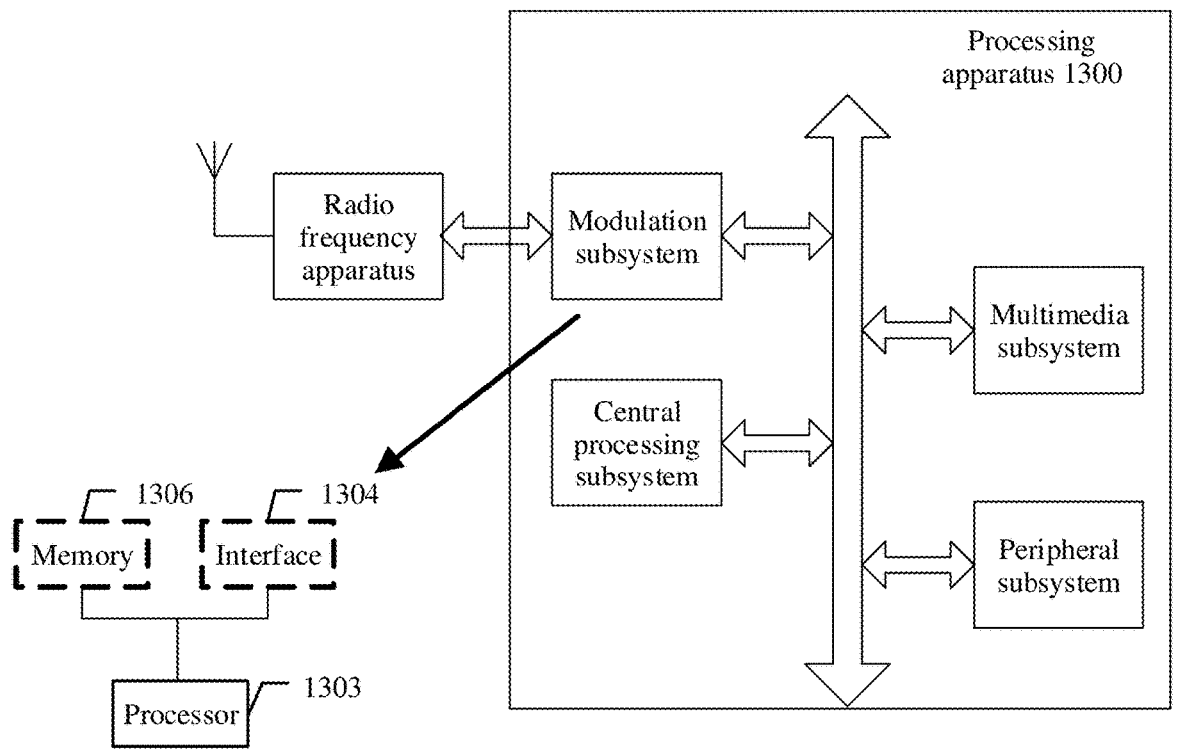
FIG. 13 is still another schematic block diagram of a communications apparatus according to an embodiment of this application.

FIG. 13 shows another form of this embodiment. A processing apparatus 1300 includes modules such as a modulation subsystem, a central processing subsystem, and a peripheral subsystem. The communications apparatus in this embodiment may be used as the modulation subsystem in the processing apparatus. For example, the modulation subsystem may include a processor 1303 and an interface 1304. The processor 1303 implements functions of the processing module 710, and the interface 1304 implements functions of the transceiver module 720. Alternatively, the processor 1303 implements functions of the processing module 910, and the interface 1304 implements functions of the transceiver module 920. In another variation, the modulation subsystem includes a memory 1306, a processor 1303, and a program that is stored in the memory 1306 and that can be run on the processor. When executing the program, the processor 1303 implements the method on the terminal device side in the foregoing method embodiment. It should be noted that the memory 1306 may be a nonvolatile memory or a volatile memory. The memory 1306 may be located in the modulation subsystem, or may be located in the processing apparatus 1300, provided that the memory 1306 can be connected to the processor 1303.

An embodiment of this application further provides a communications system. The communications system may include at least one terminal device in the embodiment shown in FIG. 2, include at least one terminal device in the embodiment shown in FIG. 5, or include at least one terminal device in the embodiment shown in FIG. 2 and at least one terminal device in the embodiment shown in FIG. 5. The terminal device in the embodiment shown in FIG. 2 is, for example, the communications apparatus 700 in FIG. 7 or the communications apparatus 800 in FIG. 8, and the terminal device in the embodiment shown in FIG. 5 is, for example, the communications apparatus 900 in FIG. 9 or the communications apparatus 1000 in FIG. 10. For example, the terminal device in the embodiment shown in FIG. 2 may be configured to perform all operations performed by the terminal device in the embodiment shown in FIG. 2, for example, S21 to S23 in the embodiment shown then FIG. 2, and/or configured to support another process of the technology described in this specification. The terminal device in the embodiment shown in FIG. 5 may be configured to perform all operations performed by the terminal device in the embodiment shown in FIG. 5, for example, S51 to S53 in the embodiment shown in FIG. 5, and/or configured to support another process of the technology described in this specification.

An embodiment of this application further provides a computer-readable storage medium. The computer-readable storage medium is configured to store a computer program. When the computer program is executed by a computer, the computer may implement a procedure related to the terminal device provided in the method embodiment shown in FIG. 2.

An embodiment of this application further provides a computer-readable storage medium. The computer-readable storage medium stores a computer program. When the computer program is executed by a computer, the computer may implement a procedure related to the terminal device provided in the method embodiment shown in FIG. 5.

An embodiment of this application further provides a computer program product. The computer program product is configured to store a computer program. When the computer program is executed by a computer, the computer may implement a procedure related to the terminal device provided in the method embodiment shown in FIG. 2.

An embodiment of this application further provides a computer program product. The computer program product is configured to store a computer program. When the computer program is executed by a computer, the computer may implement a procedure related to the terminal device provided in the method embodiment shown in FIG. 5.

It should be understood that the processor mentioned in the embodiments of this application may be a CPU, or may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

It should be further understood that the memory in the embodiments of this application may be a volatile memory or a non-volatile memory, or may include both a volatile memory and a non-volatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate, a transistor logic device, or a discrete hardware component, the memory is integrated into the processor.

It should be noted that the memory described in this specification aims to include but is not limited to these memories and any memory of another proper type.

It should be understood that sequence numbers of the foregoing processes do not mean execution orders in various embodiments of this application. The execution orders of the processes should be determined based on functions and internal logic of the processes, and should not be construed as any limitation on the implementation processes of the embodiments of this application.

A person of ordinary skill in the art may be aware that units, algorithms, and steps in the examples described with reference to the embodiments disclosed in this application can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions of the embodiments.

In addition, functional units in the embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A communications method, comprising:
   determining, by a processor, that a terminal device meets a first condition based on the signal quality of at least one reference signal of a serving cell of the terminal device, wherein the at least one reference signal corresponds to at least one sending direction;
   determining that a duration since a cell reselection process was last performed is less than or equal to a preset duration; and in response to determining the duration since the cell reselection process was last performed is less than or equal to the preset duration, skipping performing an intra-frequency measurement or an inter-frequency measurement.

2. The method according to claim 1, wherein the determining the terminal device meets the first condition comprises:
in response to determining that the signal quality of a first reference signal of the serving cell meets a first sub-condition in a first duration, determining that the terminal device meets the first condition, wherein the signal quality of the first reference signal is higher than the signal quality of another reference signal in the at least one reference signal; or
in response to determining that the signal quality of each of M reference signals in the at least one reference signal meets a first sub-condition in a first duration, determining that the terminal device meets the first condition, wherein M is an integer greater than or equal to 1, and M is less than or equal to a quantity of the at least one reference signal; or
obtaining first information based on the signal quality of the at least one reference signal, and in response to determining that the first information meets a second sub-condition in a first duration, determining that the terminal device meets the first condition.

3. The method according to claim 2, wherein the first sub-condition comprises:
a difference between a first signal quality of one reference signal and a second signal quality of the one reference signal is less than or equal to a first threshold, wherein the first signal quality of the one reference signal is a reference value of signal quality corresponding to the one reference signal, and the second signal quality of the one reference signal is a current signal quality of the one reference signal.

4. The method according to claim 2, wherein the first information satisfies the following formula:

$$S=\Sigma_{i=1}^{N}(S_{ref,i}-S_i)^2 \text{ or } S=\Sigma_{i=1}^{N}|(S_{ref,i}-S_i)|, \text{ where}$$

S represents the first information, i represents a sequence number of an $i^{th}$ reference signal in the at least one reference signal, N represents the quantity of the at least one reference signal, $S_i$ represents second signal quality of the $i^{th}$ reference signal, and $S_{ref,i}$ represents the first signal quality of the $i^{th}$ reference signal.

5. The method according to claim 4, wherein the second sub-condition comprises:
S is less than or equal to a second threshold, or S/N is less than or equal to a second threshold.

6. The method according to claim 2, wherein the method further comprises:
after the terminal device completes a cell selection process or a cell reselection process, when a second signal quality of the one reference signal is higher than the first signal quality of the one reference signal, or when a duration in which the terminal device does not meet the first condition reaches a second duration, setting the first signal quality of the one reference signal to the second signal quality of the one reference signal.

7. The method according to claim 1, wherein the method further comprises:
based on the signal quality of the at least one reference signal, determining that the terminal device is located at an edge location of the serving cell of the terminal device, or determining that the terminal device meets a criterion for performing a neighboring cell measurement.

8. The method according to claim 1, wherein before skipping performing the intra-frequency measurement or the inter-frequency measurement, the method further comprises:
determining that a duration in which the terminal device performs the intra-frequency measurement or the inter-frequency measurement since the cell selection process was last performed or the cell reselection process was last performed is greater than the preset duration.

9. A communications apparatus, comprising:
a communications interface, configured to communicate with another apparatus; and
a processor, configured to:
determine, based on the signal quality of at least one reference signal of a serving cell, that the communications apparatus meets a first condition;
determine that a duration since a cell reselection process was last performed is less than or equal to a preset duration; and
in response to determining the duration since the cell reselection process was last performed is less than or equal to the preset duration, skip performing an intra-frequency measurement or an inter-frequency measurement, wherein the at least one reference signal corresponds to at least one sending direction.

10. The communications apparatus according to claim 9, wherein the processor is configured to determine the communications apparatus meets the first condition by:
in response to determining that the signal quality of a first reference signal of the serving cell meets a first sub-condition in a first duration, determining that the communications apparatus meets the first condition, wherein the signal quality of the first reference signal is higher than the signal quality of another reference signal in the at least one reference signal; or
in response to determining that the signal quality of each of M reference signals in the at least one reference signal meets a first sub-condition in a first duration, determining that the communications apparatus meets the first condition, wherein M is an integer greater than or equal to 1, and M is less than or equal to a quantity of the at least one reference signal; or
obtaining first information based on the signal quality of the at least one reference signal, and in response to determining that the first information meets a second sub-condition in a first duration, determining that the communications apparatus meets the first condition.

11. The communications apparatus according to claim 10, wherein the first sub-condition comprises:
a difference between a first signal quality of one reference signal and a second signal quality of the one reference signal is less than or equal to a first threshold, wherein the first signal quality of the one reference signal is a reference value of signal quality corresponding to the one reference signal, and the second signal quality of the one reference signal is a current signal quality of the one reference signal.

12. The communications apparatus according to claim 10, wherein the first information satisfies the following formula:

$$S=\Sigma_{i=1}^{N}(S_{ref,i}-S_i)^2 \text{ or } S=\Sigma_{i=1}^{N}|(S_{ref,i}-S_i)|, \text{ where}$$

S represents the first information, i represents a sequence number of an $i^{th}$ reference signal in the at least one reference signal, N represents the quantity of the at least one reference signal, $S_i$ represents second signal quality of the $i^{th}$ reference signal, and $S_{ref,i}$ represents the first signal quality of the $i^{th}$ reference signal.

13. The communications apparatus according to claim 12, wherein the second sub-condition comprises:

S is less than or equal to a second threshold, or S/N is less than or equal to a second threshold.

14. The communications apparatus according to claim 10, wherein the processor is further configured to:

after the communications apparatus completes a cell selection process or a cell reselection process, when the second signal quality of the one reference signal is higher than the first signal quality of the one reference signal, or when a duration in which the communications apparatus does not meet the first condition reaches a second duration, set the first signal quality of the one reference signal to the second signal quality of the one reference signal.

15. The communications apparatus according to claim 9, wherein the processor is further configured to:

based on the signal quality of the at least one reference signal, determine that the communications apparatus is located at an edge location of the serving cell of the communications apparatus, or determine that the communications apparatus meets a criterion for performing a neighboring cell measurement.

16. The communications apparatus according to claim 9, wherein the processor is further configured to:

before skipping performing the intra-frequency measurement or the inter-frequency measurement, determine that a duration in which the communications apparatus performs the intra-frequency measurement or the inter-frequency measurement since the cell selection process was last performed or the cell reselection process was last performed is greater than the preset duration.

17. A non-transitory computer readable storage medium, having instruction stored thereon that, when executed by a processor, cause an apparatus to:

determine, that a terminal device meets a first condition based on the signal quality of at least one reference signal of a serving cell of the terminal device, wherein the at least one reference signal corresponds to at least one sending direction;

determine that a duration since a cell reselection process was last performed is less than or equal to a preset duration; and in response to determining the duration since the cell reselection process was last performed is less than or equal to the preset duration, skip performing an intra-frequency measurement or an inter-frequency measurement.

18. The non-transitory computer readable medium according to claim 17, wherein the apparatus is caused to determine that the terminal device meets the first condition by:

in response to determining that the signal quality of a first reference signal of the serving cell meets a first sub-condition in a first duration, determining that the terminal device meets the first condition, wherein the signal quality of the first reference signal is higher than the signal quality of another reference signal in the at least one reference signal; or in response to determining that the signal quality of each of M reference signals in the at least one reference signal meets a first sub-condition in a first duration, determining that the terminal device meets the first condition, wherein M is an integer greater than or equal to 1, and M is less than or equal to a quantity of the at least one reference signal; or obtaining first information based on the signal quality of the at least one reference signal, and in response to determining that the first information meets a second sub-condition in a first duration, determining that the terminal device meets the first condition.

19. The non-transitory computer readable medium according to claim 18, wherein the first information satisfies the following formula:

$S=\Sigma_{i=1}^{N}(S_{ref,i}-S_i)^2$ or $S=\Sigma_{i=1}^{N}|(S_{ref,i}-S_i)|$, where S represents the first information, i represents a sequence number of an $i^{th}$ reference signal in the at least one reference signal, N represents the quantity of the at least one reference signal, $S_i$ represents second signal quality of the $i^{th}$ reference signal, and $S_{ref,i}$ represents the first signal quality of the $i^{th}$ reference signal.

20. The non-transitory computer readable medium according to claim 19, wherein the second sub-condition comprises:

S is less than or equal to a second threshold, or S/N is less than or equal to a second threshold.

\* \* \* \* \*